(12) United States Patent
Wang et al.

(10) Patent No.: US 11,942,971 B2
(45) Date of Patent: Mar. 26, 2024

(54) SPLIT CHAINING FOR LARGE PHASE ARRAY SYSTEMS

(71) Applicant: QUALCOMM Incorporated, San Diego, CA (US)

(72) Inventors: Chuan Wang, San Diego, CA (US); Li Liu, San Diego, CA (US); Wu-Hsin Chen, San Diego, CA (US); Vinod Panikkath, San Diego, CA (US); Yunfei Feng, San Diego, CA (US); Muhammad Hassan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/686,794

(22) Filed: Mar. 4, 2022

(65) Prior Publication Data

US 2023/0283303 A1   Sep. 7, 2023

(51) Int. Cl.
  *H04B 1/00* (2006.01)
  *H04B 1/04* (2006.01)
  *H04B 1/10* (2006.01)

(52) U.S. Cl.
  CPC ......... *H04B 1/0057* (2013.01); *H04B 1/0035* (2013.01); *H04B 1/0483* (2013.01); *H04B 2001/0408* (2013.01)

(58) Field of Classification Search
  CPC .. H04B 1/0057; H04B 1/0035; H04B 1/0483; H04B 2001/0408
  USPC ...................................................... 455/552.1
  See application file for complete search history.

(56) References Cited

U.S. PATENT DOCUMENTS 9,525,439 B2   12/2016   Yehezkely

OTHER PUBLICATIONS

Tirdad Sowlati et al., A 60-GHz144-Element Phased-Array Transceiver for Backhaul Application, IEEE Journal of Solid-State Circuits, vol. 53, No. 12, Dec. 2018 (Year: 2018).*
Sowlati T., et al., "A 60-GHz 144-Element Phased-Array Transceiver for Backhaul Application", IEEE Journal of Solid-State Circuits, vol. 53, No. 12, Dec. 2018, pp. 3640-3659.
Sowlati T., et al., "A 60GHz 144-Element Phased-Array Transceiver with 51dBm Maximum EIRP and ±60° Beam Steering for Backhaul Application," 2018 IEEE International Solid-State Circuits Conference, ISSCC 2018 / Session 4 / mm-WAVE Radios for 5G and Beyond / 4.2, Feb. 12, 2018, 3 Pages.

* cited by examiner

*Primary Examiner* — Tanmay K Shah
(74) *Attorney, Agent, or Firm* — Polsinelli/Qualcomm

(57) ABSTRACT

Aspects described herein include devices and methods with chain routing of signals for massive antenna arrays. In some aspects, an apparatus is provided that includes a first millimeter wave (mmW) transceiver having a first port, a second port, one or more antenna elements, a plurality of chain mmW transceiver ports, and switching circuitry. The switching circuitry is controllable by control data to route portions of a merged clock and data signal and a merged control and data signal between a first route between the one or more antenna elements and the first port and a second route between the one or more antenna elements and the second port and a third route between the first port and the plurality of chain mmW transceiver ports and a fourth route between the second port and the plurality of chain mmW transceiver ports.

30 Claims, 15 Drawing Sheets

SPLIT CHAINING FOR LARGE PHASE ARRAY SYSTEMS

FIELD

The present disclosure relates generally to electronics and wireless communications. For example, aspects of the present disclosure relate to large phase array systems and routing used to provide signals to circuitry for large phase array antenna systems.

BACKGROUND

Wireless communication devices and technologies are becoming ever more prevalent. Wireless communication devices generally transmit and receive communication signals. A communication signal is typically processed by a variety of different components and circuits. In some modern communication systems, phase array antennas are used to improve system operation with improved link budgets, system capacity, beamforming, multiple-in multiple-out (MIMO) communications, and other such system operation. Supporting such systems can involve complex system design choices, and managing complex interactions among device elements and signals.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

Aspects described herein include devices, wireless communication apparatuses, circuits, and modules supporting millimeter wavelength (mmW) communications. MmW communications are part of fifth generation communications systems, which use electromagnetic waves between approximately 20 gigahertz (GHz) and 300 GHz. Further, mmW communications may be a part of other systems, such as WiFi, radar and/or sensing systems, etc. Certain mmW networks use large array size (e.g., hundreds or thousands of antenna elements) beamforming systems. Such systems can be used to improve a link budget and system capacity, as well as support various communication technologies. Conventionally, 1:2 or 1:4 diplexers are used in combinations to provide signal routing from a communication data source to the antenna elements in an array, with each antenna element having independent circuitry to control the signal for a specific antenna element (e.g., phase shift circuitry, etc.). Use of 1:2 or 1:4 splitters (e.g., or other such one-to-many splitters) causes significant design challenges, such as the need to manage control (CTRL) and clock (CLK) signals that may be combined with data signals. Aspects described herein include devices where chained routing (e.g., daisy chain configurations) is used in place of one-to-many splitters in configurations to provide combined control/data and clock/data signals from an intermediate frequency (IF) transceiver apparatus to a series of millimeter wave (mmW) transceivers apparatus. Improvements to such devices may support massive phase array systems with common small transceivers having a limited number of ports, while reducing or completely omitting splitters for cost reduction, as well as improving performance. Additionally, in some aspects, the daisy chain mmW transceiver structure uses only 4 low frequency routings, with no need for direct current (DC) chained supplies to accommodate drop issues when massive phase arrays are operated simultaneously.

In some aspects, a wireless communication apparatus is provided comprising a first millimeter wave (mmW) transceiver, the first mmW transceiver comprising: a first port for communicating a merged control and data signal; a second port for communicating a merged clock and data signal associated with the merged control and data signal; one or more antenna elements; a plurality of chain mmW transceiver ports; and switching circuitry controllable by control data to route portions of the merged clock and data signal and the merged control and data signal between: a first route between the one or more antenna elements and the first port and a second route between the one or more antenna elements and the second port; and a third route between the first port and the plurality of chain mmW transceiver ports and a fourth route between the second port and the plurality of chain mmW transceiver ports.

In some aspects, the wireless communication apparatus of further comprises a second mmW transceiver, the second mmW transceiver comprising: a first port coupled to a first data port of the plurality of chain mmW transceiver ports; and a second port coupled to a second data port of the plurality of chain mmW transceiver ports.

In some aspects, the first data port is a chained control and data port coupled to a first multiplexing diplexer of the first mmW transceiver; wherein the second data port is a chained clock and data port coupled to a second multiplexing diplexer of the first mmW transceiver.

In some aspects, the second mmW transceiver further comprises a second clock port coupled to a first clock port of the plurality of chain mmW transceiver ports as part of a chain clock path.

In some aspects, the second mmW transceiver further comprises a second control port coupled to a first control port of the plurality of chain mmW transceiver ports as part of a chain control path.

In some aspects, the first mmW transceiver comprises a first demultiplexing diplexer that couples the first port of the first mmW transceiver to the first data port and the first clock port to demultiplex the merged clock and data signal into separate clock and data signals.

In some aspects, the first mmW transceiver comprises a second demultiplexing diplexer that couples the second port of the first mmW transceiver to the second data port and the first control port to demultiplex the merged control and data signal into separate control and data signals.

In some aspects, the first mmW transceiver further comprises: first frequency conversion circuitry in the first route configured to convert a first data signal associated with the merged control and data signal between IF frequencies and mmW frequencies; and second frequency conversion circuitry in the second route configured to convert a second data signal associated with the merged clock and data signal between the IF frequencies and the mmW frequencies.

In some aspects, the first mmW transceiver further comprises: first frequency conversion circuitry in the first route configured to convert a first data signal associated with the merged control and data signal between IF frequencies and mmW frequencies; and second frequency conversion circuitry in the second route configured to convert a second data signal associated with the merged clock and data signal between the IF frequencies and the mmW frequencies.

In some aspects, the second mmW transceiver further comprises: second one or more antenna elements; and second switching circuitry controllable by the control data to select between: a fifth route coupling the first port to the one or more antenna elements and a sixth route coupling the second port to the one or more antenna elements; and a seventh route coupling the first port to a first chained data port of the second mmW transceiver and an eighth route coupling the second port to a second chained data port of the second mmW transceiver.

In some aspects, the second mmW transceiver further comprises: first frequency conversion circuitry in the fifth route configured to convert a first data signal associated with the merged control and data signal between IF frequencies and mmW frequencies; and second frequency conversion circuitry in the sixth route configured to convert a second data signal associated with the merged clock and data signal between the IF frequencies and the mmW frequencies.

In some aspects, the wireless communication apparatus of further comprises a third mmW transceiver, the third mmW transceiver comprising: third one or more antenna elements; a first port coupled to the first chained data port, the first port configured to communicate a first data signal associated with the merged control and data signal with the second mmW transceiver; a second port coupled to the second chained data port, the second port configured to communicate a second data signal associated with the merged clock and data signal with the second mmW transceiver; a third port coupled to a chained control port of the second mmW transceiver, the second port configured to communicate a control signal associated with the merged control and data signal; and a fourth port coupled to a chained clock port of the second mmW transceiver, the fourth port configured to communicate a clock signal associated with the merged clock and data signal.

In some aspects, the wireless communication apparatus of further comprises a processor; and an intermediate frequency (IF) transceiver coupled to the processor, the IF transceiver comprising: an IF merged clock and data port coupled to the first port of the first mmW transceiver as part of a merged clock and data path for the merged clock and data signal; and an IF merged control and data port coupled to the second port of the first mmW transceiver as part of a merged control and data path for the merged control and data signal.

In some aspects, the wireless communication apparatus is configured to transmit the first data signal and the second data signal via the third one or more antenna elements using the first data signal, the second data signal, the clock signal, and the control signal received from the IF transceiver via the first mmW transceiver and the second mmW transceiver.

In some aspects, the wireless communication apparatus is configured to: receive the first data signal, the second data signal, the clock signal, and the control signal at the third one or more antennas; communicate the first data signal and the control signal to the IF merged control and data port of the IF transceiver via the second mmW transceiver and the first mmW transceiver; communicate the second data signal and the clock signal to the IF merged clock and data port of the IF transceiver via the second mmW transceiver and the first mmW transceiver; and process the data signal using the processor.

In some aspects, the first mmW transceiver is configured to merge the first data signal and the control signal into the merged control and data signal using a first diplexer; wherein the first mmW transceiver is configured to merge the second data signal and the control signal into the merged clock and data signal using a second diplexer.

In some aspects, the wireless communication apparatus further comprises a display screen; and control circuitry coupled to the display screen and the first mmW transceiver and configured to transmit and receive data using a daisy chain routing including the first mmW transceiver.

In some aspects, the first route comprises a first transmit path variable gain amplifier (VGA), a first receive path VGA coupled between the first port and the one or more antenna elements, and switching circuitry to select between the first transmit path VGA and the first receive path VGA; wherein the second route comprises a second transmit path VGA, a second receive path VGA coupled between the second port and the one or more antenna elements, and switching circuitry to select between the second transmit path VGA and the second receive path VGA In some aspects, the third route comprises a first receive signal path VGA buffer, a first transmit signal path VGA buffer, and switching circuitry to select between the first receive signal path VGA buffer and the first transmit signal path VGA buffer; wherein the fourth route comprises a second receive signal path VGA buffer, a second transmit signal path VGA buffer, and switching circuitry configured to select between the second receive signal path VGA buffer and the second transmit signal path VGA buffer.

In some aspects, a method is provided, comprising: generating a first analog data signal and a second analog data signal; generating control data and clock data for the first analog data signal and the second analog data signal; merging, by an intermediate frequency (IF) transceiver, the control data and the first analog data signal to generate a merged control and data signal; merging, by the IF transceiver, the clock data and the second analog data signal to generate a merged clock and data signal; and communicating the first analog data signal and the second analog data signal between the IF transceiver and a target mmW transceiver via a daisy chain routing, wherein the daisy chain routing comprises at least a first mmW transceiver in the daisy chain routing between the IF transceiver and the target mmW transceiver.

In some aspects, the method further comprises splitting the merged control and data signal using a first diplexer of a first mmW transceiver between the IF transceiver and the target mmW transceiver; splitting the merged clock and data signal using a second diplexer of a first mmW transceiver between the IF transceiver and the target mmW transceiver; and routing, by the first mmW transceiver, the clock signal, the control signal, the first analog data signal, and the second analog data signal to the target mmW transceiver.

In some aspects, the method further comprises receiving a third analog data signal, a fourth analog data signal, a second control signal, and a second clock signal at one or more antennas of the target mmW transceiver; and down-converting the third analog data signal and the fourth analog data signal from mmW frequencies to IF frequencies using frequency conversion circuitry of the target mmW transceiver.

In some aspects, the method further comprises communicating the third analog data signal, a fourth analog data signal, the second control signal, and the second clock signal to the first mmW transceiver from the target mmW transceiver; merging, by a first diplexer of the first mmW transceiver, the second control signal and the third analog data signal to generate a second merged control and data signal; and merging, by a second diplexer of the first mmW transceiver, the clock data and the second analog data signal to generate a second merged clock and data signal.

In some aspects, the method further comprises communicating the second merged control and data signal and the second merged clock and data signal from the first mmW transceiver to the IF transceiver; generating, by the IF transceiver, the second analog data signal using the second merged control and data signal and the second merged clock and data signal; converting the second analog data signal to a second digital data signal using an analog to digital converter coupled to the IF transceiver; and processing the second digital data signal using a processor coupled to the analog to digital converter.

In some aspects, another device is provided, comprising a first millimeter wave (mmW) transceiver and a second mmW transceiver coupled to the first mmW transceiver via a daisy chain routing path. In some aspects, the first mmW transceiver comprises a plurality of intermediate frequency (IF) transceiver connection ports; one or more antenna elements; and switching circuitry configured to select between connecting the plurality of IF transceiver connection ports to the one or more antenna elements and connecting the plurality of IF transceiver connection ports to the second mmW transceiver via the daisy chain routing path.

In some aspects, the first mmW transceiver further comprises: a first diplexer coupled to a first port of the plurality of IF transceiver connection ports, a first data port of the second mmW transceiver, and a control port of the second mmW transceiver; wherein the first diplexer is configured for two-way operation to convert between a merged control and data signal communicated with an IF transceiver via the first port and separate control and first data signals communicated with the second mmW transceiver via the control port and the first data port; wherein the daisy chain routing path comprises the control port and the first data port.

In some aspects, the first mmW transceiver further comprises: a second diplexer coupled to a second port of the plurality of IF transceiver connection ports, a second data port of the second mmW transceiver, and a clock port of the second mmW transceiver; wherein the second diplexer is configured for two-way operation to convert between a merged clock and data signal communicated with the IF transceiver via the second port and separate clock and second data signals communicated with the second mmW transceiver via the control port and the second data port; wherein the daisy chain routing path comprises the clock port and the second data port.

In some aspects, the apparatuses described above can include a mobile device with a camera for capturing one or more pictures. In some aspects, the apparatuses described above can include a display screen for displaying one or more pictures. In some aspects, additional wireless communication circuitry is provided (e.g., non-mmW communication circuitry). The summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and embodiments, will become more apparent upon referring to the following specification, claims, and accompanying drawings.

BRIEF DESCRIPTION OF THE DRAWINGS

In the figures, like reference numerals refer to like parts throughout the various views unless otherwise indicated. For reference numerals with letter character designations such as "102$a$" or "102$b$", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
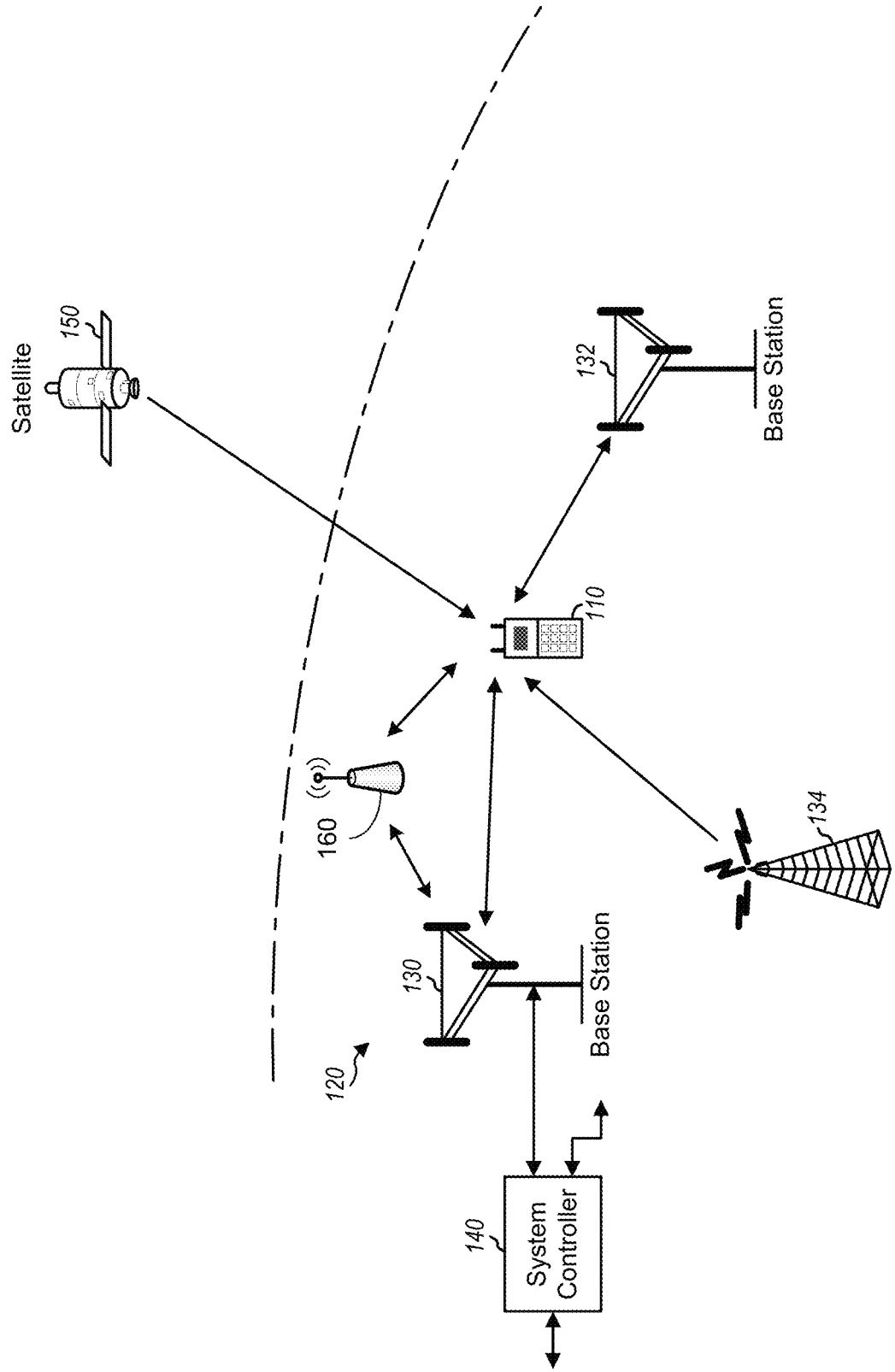
FIG. 1 is a diagram showing a wireless communication system communicating with a wireless device that can be implemented according to aspects described herein.

The detailed description set forth below in connection with the appended drawings is intended as a description of exemplary implementations and is not intended to represent the only implementations in which the invention may be practiced. The term "exemplary" used herein means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form. Drawing elements that are common among the following figures may be identified using the same reference numerals.

The progression of wireless communication infrastructure, particularly for Third Generation Partnership Project (3GPP) fifth generation (5G) millimeter wavelength (mmW) systems, involves the use of antenna arrays with tens, hundreds, or thousands of elements. 5G systems have performance criteria where improved link budget within devices and improved wireless coverage performance are important design considerations. The signal delivery routings for antenna arrays with smaller numbers of antenna elements oftentimes use one-to-many splitters, such as 1:2 or 1:4 splitters. Such splitters may introduce large splitter losses into the signal path, increase module area and cost, and may introduce additional challenges associated with the use of merged control, clock, and data signals. For example, in some implementations, to accommodate 1:2 or 1:4 splitters, an IF transceiver needs higher control/data or clock/data swing, which limits the total number of antenna array sizes with a given number of ports from intermediate frequency (IF) and mmW transceivers. Additionally, some systems use DC-chained supplies and implement configurations to address voltage drop concern when massive phase arrays operate simultaneously. Some aspects described herein are only limited to four low frequency routings, or other low numbers of low frequency routings (e.g., 2, 4, etc.) Such aspects may reduce or eliminate direct current chained supply issues used to accommodate drop concerns when massive phase arrays in a single mmW device operate simultaneously.

According to aspects described, devices are described that include transceivers (e.g., intermediate frequency (IF) and mmW transceivers) which use chained signal paths instead of one-to-many (e.g., 1:2, 1:4, etc.) splitters to route data, control, and clock signals. Apparatuses and devices according to such aspects can, in some implementations, provide flexibility in signal routing and lower loss in the paths for such routing. Such characteristics improve the performance of devices in the context of large arrays of antenna elements for beamforming systems and other such systems in communication devices. Such performance can be used to improve 5G user equipment or terminals (UE), customer premises equipment (CPE), 5G radio area network small cells (FSM), and 5G radio area network base stations (CSM). Further details regarding aspects of the disclosure will be described with respect to the figures.

FIG. 1 is a diagram showing a wireless device 110 communicating with a wireless communication system 120. In accordance with aspects described herein, the wireless device can include transceivers configured for chained signal routing in accordance with aspects described herein. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. Communication elements of the wireless device 110 for implementing mmW and non-mmW communications in accordance with any such communication standards can be supported by various designs of transceivers using a chained signal routing. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, or other such mobile device (e.g., a device integrated with a display screen). Other examples of the wireless device 110 include a wireless modem, a personal digital assistant (PDA), a handheld device, a laptop computer, a smartbook, a netbook, a tablet, a cordless phone, a medical device, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or signals from satellites (e.g., a satellite 150 in one or more global navigation satellite systems (GNSS), etc.). Wireless device 110 may support one or more radio technologies for wireless communication such as LTE, WCDMA, CDMA 1x, EVDO, TD-SCDMA, GSM, 802.11, 5G, etc.

The wireless communication system 120 may also include a wireless device 160. In an exemplary embodiment, the wireless device 160 may be a wireless access point, or another wireless communication device that comprises, or comprises part of a wireless local area network (WLAN). In an exemplary embodiment, the wireless device 110 may be configured as a customer premises equipment (CPE), which may be in communication with a base station 130 and another wireless device 110, or other devices in the wireless communication system 120. In some embodiments, the CPE may be configured to communicate with the wireless device 160 using WAN signaling and to interface with the base station 130 based on such communication instead of the wireless device 160 directly communicating with the base station 130. In exemplary embodiments where the wireless device 160 is configured to communicate using WLAN signaling, a WLAN signal may include WiFi, or other communication signals.

Figure 2A:
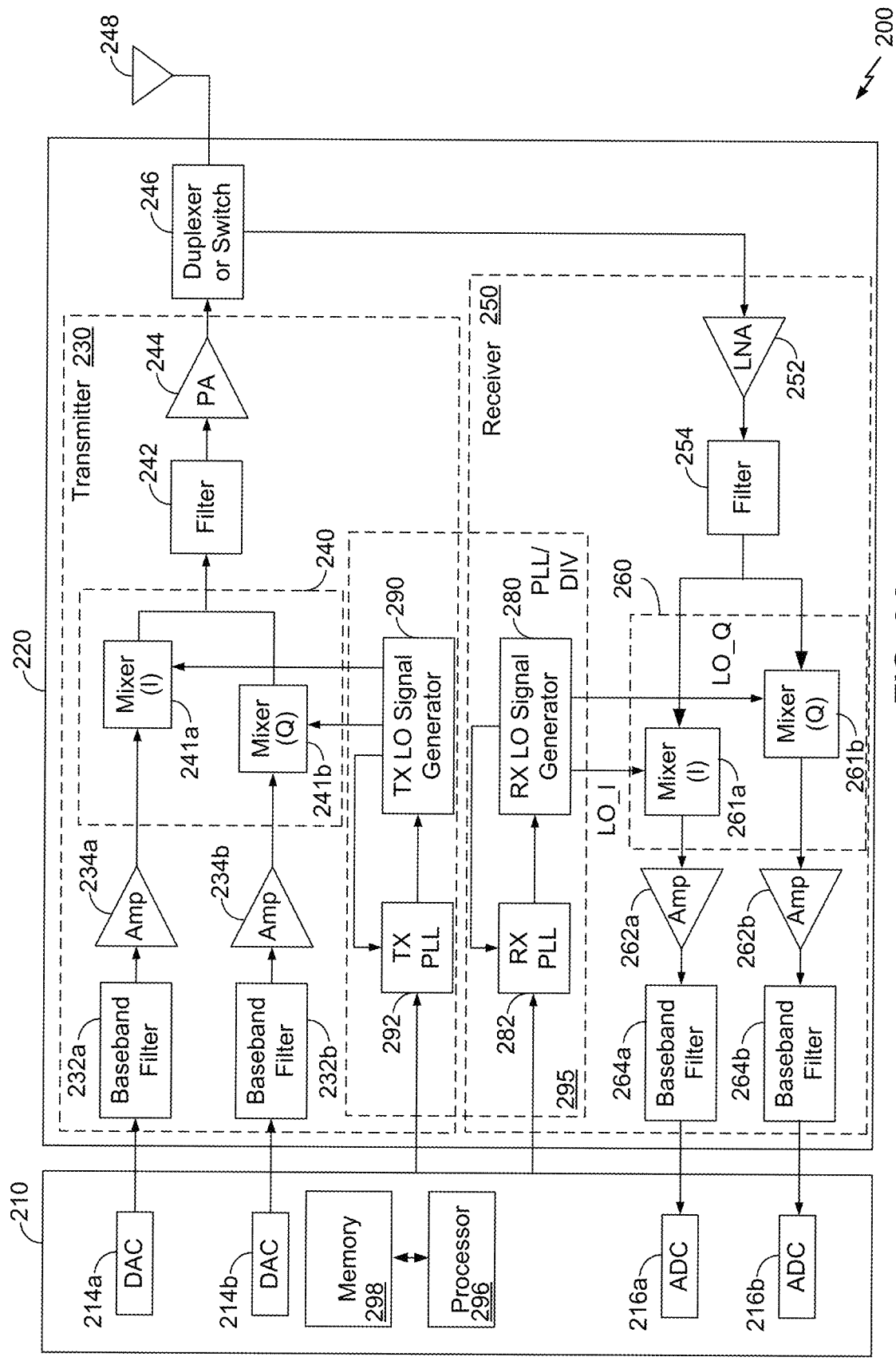
FIG. 2A is a block diagram showing portions of a wireless device in which aspects the present disclosure may be implemented.

FIG. 2A is a block diagram showing a wireless device 200 in which aspects of the present disclosure may be implemented. The wireless device 200 may, for example, be an embodiment of the devices (e.g., the base station 130 or 132, the wireless device 110 or 160, etc.) illustrated in FIG. 1. The circuitry described may be circuitry supporting mmW communications or other such communications using large arrays of antenna elements structured to receive signals via a chained routing (e.g., rather than a splitter-based routing). In some examples, the wireless device 200 (or any of the devices described and/or illustrated hereinafter) may be an example of any of the devices illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes, and may generally comprise analog and/or digital processing components. The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from the baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an unconverted signal. A filter 242 filters the upconverted signal to remove undesired images caused by the frequency upconversion as well as noise in a receive frequency band. A power amplifier 244 amplifies the signal from filter 242 to obtain the desired output power level and provides a transmit RF signal. The transmit RF signal is routed through a duplexer or switch 246 and transmitted via an antennas 248. While examples discussed herein utilize I and Q signals, those of skill in the art will understand that components of the transceiver may be configured to utilize polar modulation.

In the receive path, the antennas 248 receives communication signals and provides a received RF signal, which is routed through duplexer or switch 246 and provided to a low noise amplifier (LNA) 252. The switch 246 is designed to operate with a specific RX-to-TX duplexer frequency separation, such that RX signals are isolated from TX signals. The received RF signal is amplified by LNA 252 and filtered by a filter 254 to obtain a desired RF input signal. Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

In an exemplary embodiment, the RX PLL 282, the TX PLL 292, the RX LO signal generator 280, and the TX LO signal generator 290 may alternatively be combined into a single LO generator circuit 295, which may include common or shared LO signal generator circuitry to provide the TX LO signals and the RX LO signals. Alternatively, separate LO generator circuits may be used to generate the TX LO signals and the RX LO signals.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the switch 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the power amplifier 244, and the LNA 252 (and filter 242 and/or 254 in some examples) may be implemented separately from other components in the transmitter 230 and receiver 250, and may be implemented on a millimeter wave integrated circuit. An example super-heterodyne architecture is illustrated in FIG. 2B.

Figure 2B:
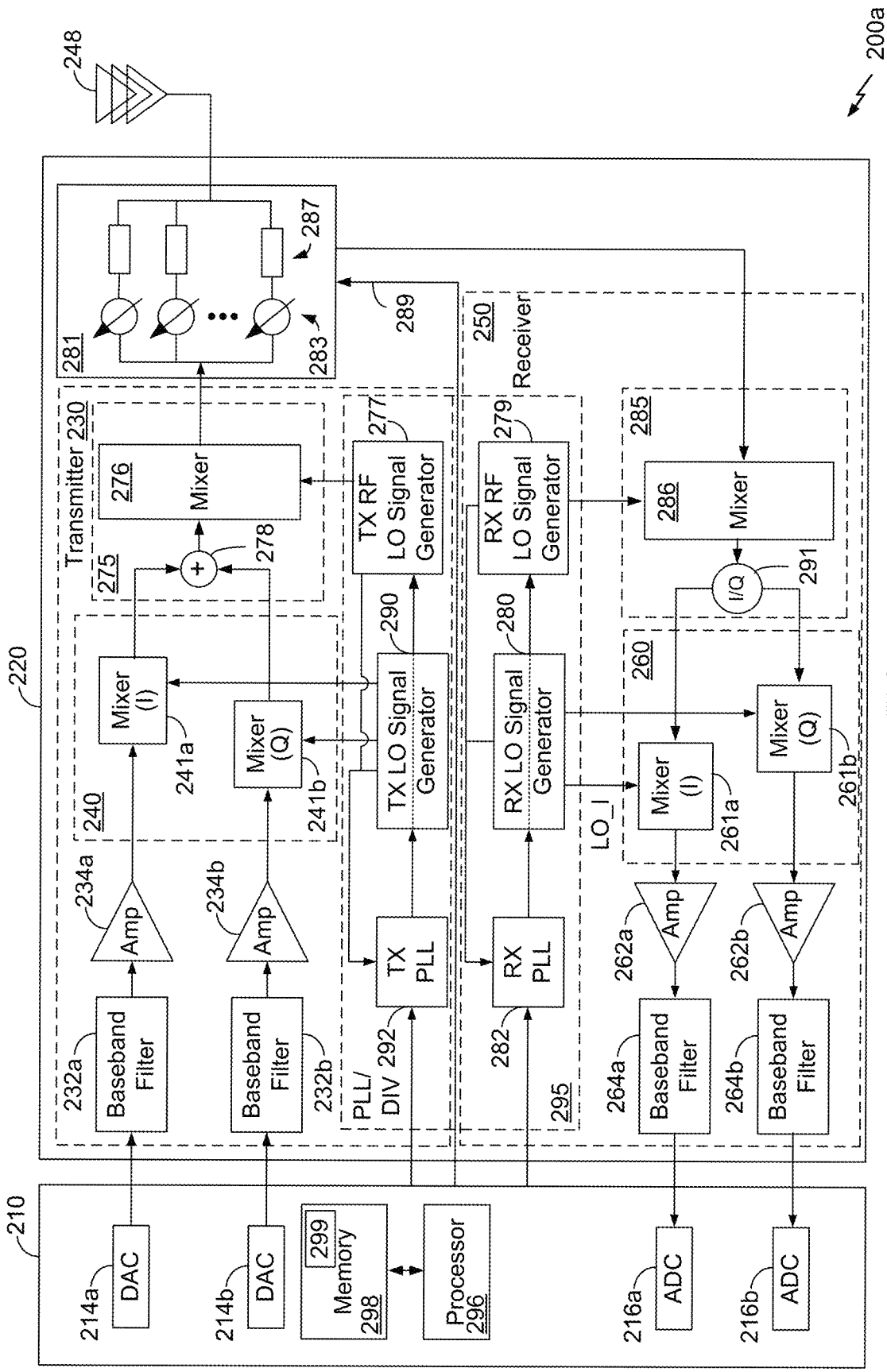
FIG. 2B is a block diagram showing portions a wireless device in which aspects of the present disclosure may be implemented.

FIG. 2B is a block diagram showing a wireless device in which aspects of the present disclosure may be implemented. Certain components, for example which may be indicated by identical reference numerals, of the wireless device 200a in FIG. 2B may be configured similarly to those in the wireless device 200 shown in FIG. 2A and the description of identically numbered items in FIG. 2B will not be repeated.

The wireless device 200*a* is an example of a heterodyne (or superheterodyne) architecture in which the upconverter 240 and the downconverter 260 are configured to process a communication signal between baseband and an intermediate frequency (IF). For example, the upconverter 240 may be configured to provide an IF signal to an upconverter 275. In an exemplary embodiment, the upconverter 275 may comprise summing function 278 and upconversion mixer 276. The summing function 278 combines the I and the Q outputs of the upconverter 240 and provides a non-quadrature signal to the mixer 276. The non-quadrature signal may be single ended or differential. The mixer 276 is configured to receive the IF signal from the upconverter 240 and TX RF LO signals from a TX RF LO signal generator 277, and provide an upconverted mmW signal to phase shift circuitry 281. While PLL 292 is illustrated in FIG. 2B as being shared by the signal generators 290, 277, a respective PLL for each signal generator may be implemented.

In an exemplary embodiment, components in the phase shift circuitry 281 may comprise one or more adjustable or variable phased array elements, and may receive one or more control signals from the data processor 210 over connection 289 and operate the adjustable or variable phased array elements based on the received control signals.

In an exemplary embodiment, the phase shift circuitry 281 comprises phase shifters 283 and phased array elements 287. Although three phase shifters 283 and three phased array elements 287 are shown for ease of illustration, the phase shift circuitry 281 may comprise more or fewer phase shifters 283 and phased array elements 287.

Each phase shifter 283 may be configured to receive the mmW transmit signal from the upconverter 275, alter the phase by an amount, and provide the mmW signal to a respective phased array element 287. Each phased array element 287 may comprise transmit and/or receive circuitry including one or more filters, amplifiers, driver amplifiers, and power amplifiers. In some embodiments, the phase shifters 283 may be incorporated within respective phased array elements 287.

The output of the phase shift circuitry 281 is provided to an antennas 248. In an exemplary embodiment, the antennas 248 comprises a number of antennas that typically correspond to the number of phase shifters 283 and phased array elements 287, for example such that each antenna element is coupled to a respective phased array element 287. In an exemplary embodiment, the phase shift circuitry 281 and the antennas 248 may be referred to as a phased array.

In a receive direction, an output of the phase shift circuitry 281 is provided to a downconverter 285. In an exemplary embodiment, the downconverter 285 may comprise an I/Q generation function 291 and a downconversion mixer 286. In an exemplary embodiment, the mixer 286 down converts the receive mmW signal provided by the phase shift circuitry 281 to an IF signal according to RX mmW LO signals provided by an RX mmW LO signal generator 279. The I/Q generation function 291 receives the IF signal from the mixer 286 and generates I and Q signals for the downconverter 260, which down converts the IF signals to baseband, as described above. While PLL 282 is illustrated in FIG. 2B as being shared by the signal generators 280, 279, a respective PLL for each signal generator may be implemented.

In some embodiments, the upconverter 275, downconverter 285, and the phase shift circuitry 281 are implemented on a common IC. In some embodiments, the summing function 278 and the I/Q generation function 291 are implemented separate from the mixers 276 and 286 such that the mixers 276, 286 and the phase shift circuitry 281 are implemented on the common IC, but the summing function 278 and I/Q generation function 291 are not (e.g., the summing function 278 and I/Q generation function 291 are implemented in another IC coupled to the IC having the mixers 276, 286). In some embodiments, the LO signal generators 277, 279 are included in the common IC. In some embodiments in which phase shift circuitry is implemented on a common IC with 276, 286, 277, 278, 279, and/or 291, the common IC and the antennas 248 are included in a module, which may be coupled to other components of the transceiver 220 via a connector. In some embodiments, the phase shift circuitry 281, for example, a chip on which the phase shift circuitry 281 is implemented, is coupled to the antennas 248 by an interconnect. For example, components of the antennas 248 may be implemented on a substrate and coupled to an integrated circuit implementing the phase shift circuitry 281 via a flexible printed circuit board or other such substrate.

In some embodiments, both the architecture illustrated in FIG. 2A and the architecture illustrated in FIG. 2B are implemented in the same device. For example, a wireless device 110 or 200 may be configured to communicate with signals having a frequency below about 20 GHz using the architecture illustrated in FIG. 2A and to communicate with signals having a frequency above about 20 GHz using the architecture illustrated in FIG. 2B. In devices in which both architectures are implemented, one or more components of FIGS. 2A and 2B that are identically numbered may be shared between the two architectures. For example, both signals that have been downconverted directly to baseband from mmW and signals that have been downconverted from mmW to baseband via an IF stage may be filtered by the same baseband filter 264*a*, 264*b*. In other embodiments, a first version of the filter 264*a*, 264*b* is included in the portion of the device which implements the architecture of FIG. 2A and a second version of the filter 264*a*, 264*b* is included in the portion of the device which implements the architecture of FIG. 2B.

As described above, example wireless devices can be configured with or without the use of an intermediate frequency (IF). Aspects described below are discussed in the context of systems that merge IF signals with control and clock signals. In some other implementations, chained signals can be used in accordance with the descriptions herein for systems without IF signals, or where control and clock signals are not merged with data signals.

Figure 2C:
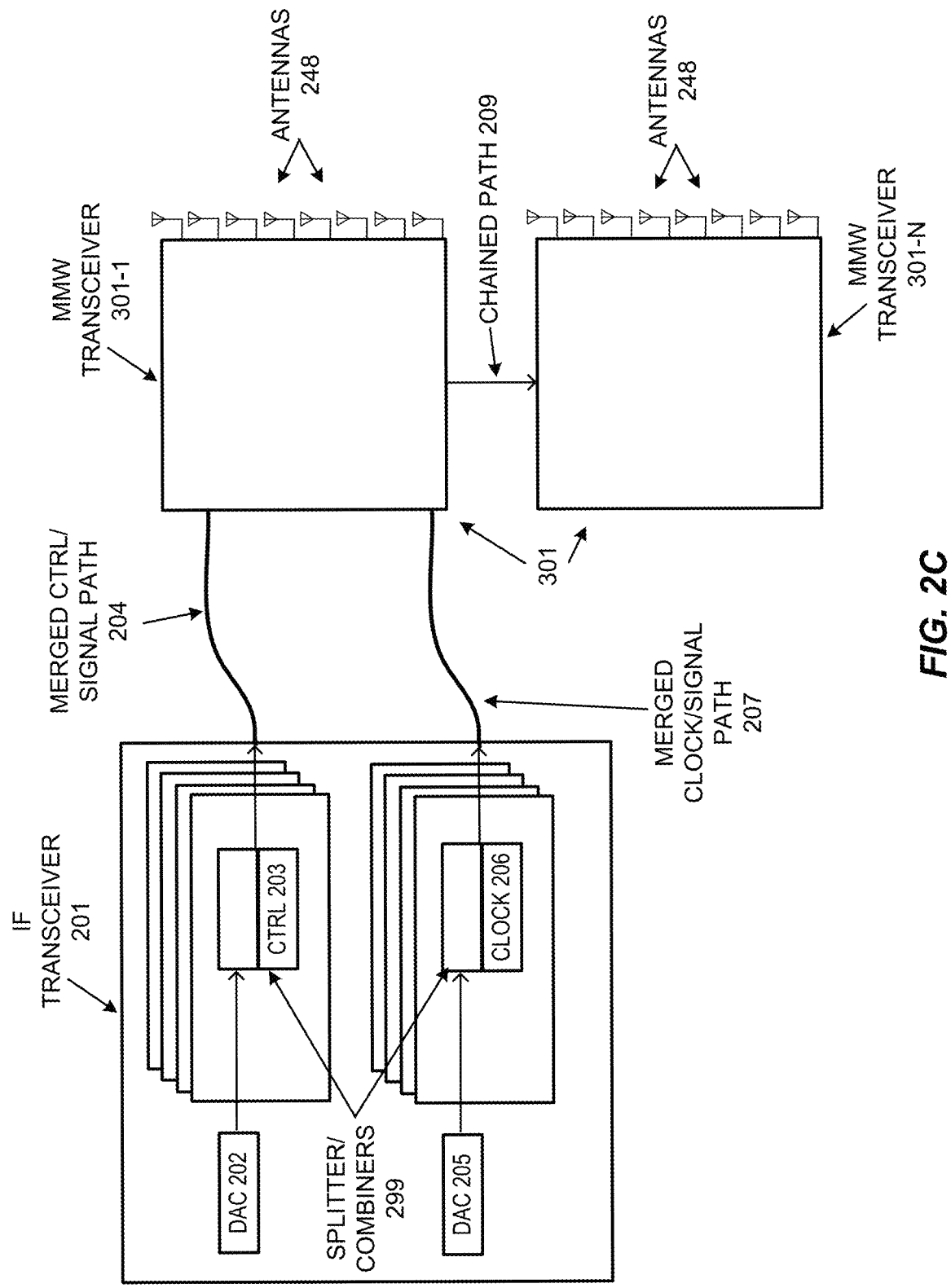
FIG. 2C is a block diagram illustrating aspects of a wireless device in which aspects of the present disclosure may be implemented.

FIG. 2C is a block diagram illustrating aspects of a wireless device in which aspects of the present disclosure may be implemented. The wireless device illustrated by FIG. 2C can structure the circuitry in FIGS. 2A-B above in an IF transceiver 201 (e.g., an IF integrated circuit (IFIC)) and mmW transceivers 301 (e.g., 301-1, 301-M, 301-N, etc.). In some examples, IF transceiver 201 is implemented in a separate chip from mmW transceiver(s) 301, and the signal paths 204 and 207 can be implemented using cables. In some such examples, the IFIC is coupled to an IC including the mmW transceiver 301-1, which may or may not be included in a package or module. In other implementations, the transceivers can be implemented on a shared PCB, in a shared package, or in a single IC where other routing paths can be used. Additional circuitry can be present in such elements, and is not shown for simplicity or is described below. In some examples, the mmW transceivers includes the mixers 276 and 286 and the phase shift circuitry 281, and the IF transceiver 201 contains the remaining elements of the transceiver 220.

The IF transceiver 201 includes two data sources, shown as data source 202 and data source 205. Each of the data source 202 and the data source 205 may provide information to be sent over a channel in a mmW communication system. Similarly, circuitry for receiving information may also or alternatively be included in place of the data sources 202 and/or 205. In one illustrative example, the data source 202 or the data source 205 is representative of DAC 214a and/or DAC 214b integrated into IF transceiver 201 to provide converted I and/or Q analog data from the digital signals generated by the data processor 210 (e.g., I and Q output currents). The IF transceiver can include data sources for a large number of different signal paths for different signal routings for a large array of antenna elements. Each routing can provide a signal path for multiple mmW transceivers 301, and multiple signal paths with a chained routing can be present in a device to support the antenna elements in the large array. Each signal path, as described above, includes analog components (e.g., H and V, different channels or frequencies, etc.). Components for a given signal path are combined, as illustrated in FIG. 2C, with a control signal 203 or a clock signal 206 using diplexers 299 (e.g., or a splitter/combiner), as illustrated. The merger of the data signal from data source 202 with control signal 203 creates a merged control/data signal that is communicated to the first mmW transceiver 301-1 in the daisy chain via merged control/signal path 204. The merger of the clock signal 206 with the data signal from data source 205 creates a merged clock/data signal that is communicated to the first mmW transceiver 301 in the daisy chain using merged clock/signal path 207. For example, the data on path 204 may be for one polarization of an antenna or array of antennas, and the data on path 207 may be for another polarization of the antenna or array of antennas. Data sent on different polarizations may be the same (e.g., for diversity purposes) or different (e.g., for MIMO). In another example, the data on path 204 may be for a first antenna or array of antennas, and the data on path 207 may be for a second antenna or array of antennas. The first and second antennas or arrays may be spaced apart, pointed in different directions, configured to communicate using different frequencies, configured as different types of antennas (e.g., one as a patch and another as a dipole), etc. In some examples, additional paths including additional data (e.g., for other or additional antennas) may be coupled between the IF transceiver 201 and the mmW transceiver 301-1 (and between mmW transceivers in the chain). In some such examples, the additional path includes data from multiple sources, which may be separated using a diplexer or other splitter as described below with respect to the paths 204 and 207.

Circuitry of the mmW transceiver 301-1 can use the signals from signal paths 204 and 207 to transmit data on the antennas 248 of the mmW transceiver 301-1. Similarly, data received on the antennas 248 of the mmW transceiver 301-1 can be communicated to the IF transceiver 201 using the paths 204 and 207. The chained path 209 can be used to communicate data between the IF transceiver 201 and the mmW transceiver 301N via the chained path 209 and the mmW transceiver 301-1. In such an implementation, mmW transceiver 301-1 can be considered a primary, master, or initial mmW transceiver in a first signal routing for the device of FIG. 2C. The mmW transceiver 301N can be considered a secondary, slave, or subsequent mmW transceiver in the first signal routing. Additional chained paths can be used to connect mmW transceiver 301N to additional mmW transceivers 301 (e.g., 301-o, 301-p, 301-z, etc.) in the first signal routing. The control signal 203 can be used to manage the routing of signals to and from antennas 248 of various mmW transceivers in the first signal routing. The mmW transceiver 301N may thus, in some aspects, receive signals from one mmW transceiver that are simply passed to another mmW transceiver, without the signals interacting with the antenna elements of a large phased array that are integrated with the mmW transceiver 301N based on the control signal 203. Further, the control signal 203 may facilitate operation within a mmW transceiver, for example controlling a signal beam (e.g., to select a codebook for beam formation), a gain of one or more amplifiers, etc.

During operation, the processor 296 (which may be an example of the data processor 210, and is not illustrated in FIG. 2C) can manage transmission of data from memory 298 (not illustrated in FIG. 2C) or receipt of data for storage in the memory 298. During transmission, control circuitry (e.g., processor 296 or other such control circuitry) can generate control data that identifies one or more target mmW transceivers 301 to be used in transmitting or receiving data. When the transmit data is merged with clock and control data using the diplexer 299 (e.g., splitter/combiners), the control data in the merged control and data signal may include information regarding the target mmW transceiver(s) 301 indicated to transmit the data. The transmit data is then communicated through the daisy chain routing to the target mmW transceiver (e.g., mmW transceiver 301N, or any other mmW transceiver in a daisy chain routing). The switching circuitry of the daisy chain routing then passes the transmit data through the routing to the appropriate mmW transceiver, where the transmit data is then processed and sent to the antennas 248 of the target mmW transceiver. Examples of how signals are routed or used within a particular transceiver of a daisy chain routing are described below in FIGS. 3A-B, 4, 5, and 6A-C.

Figure 2D:
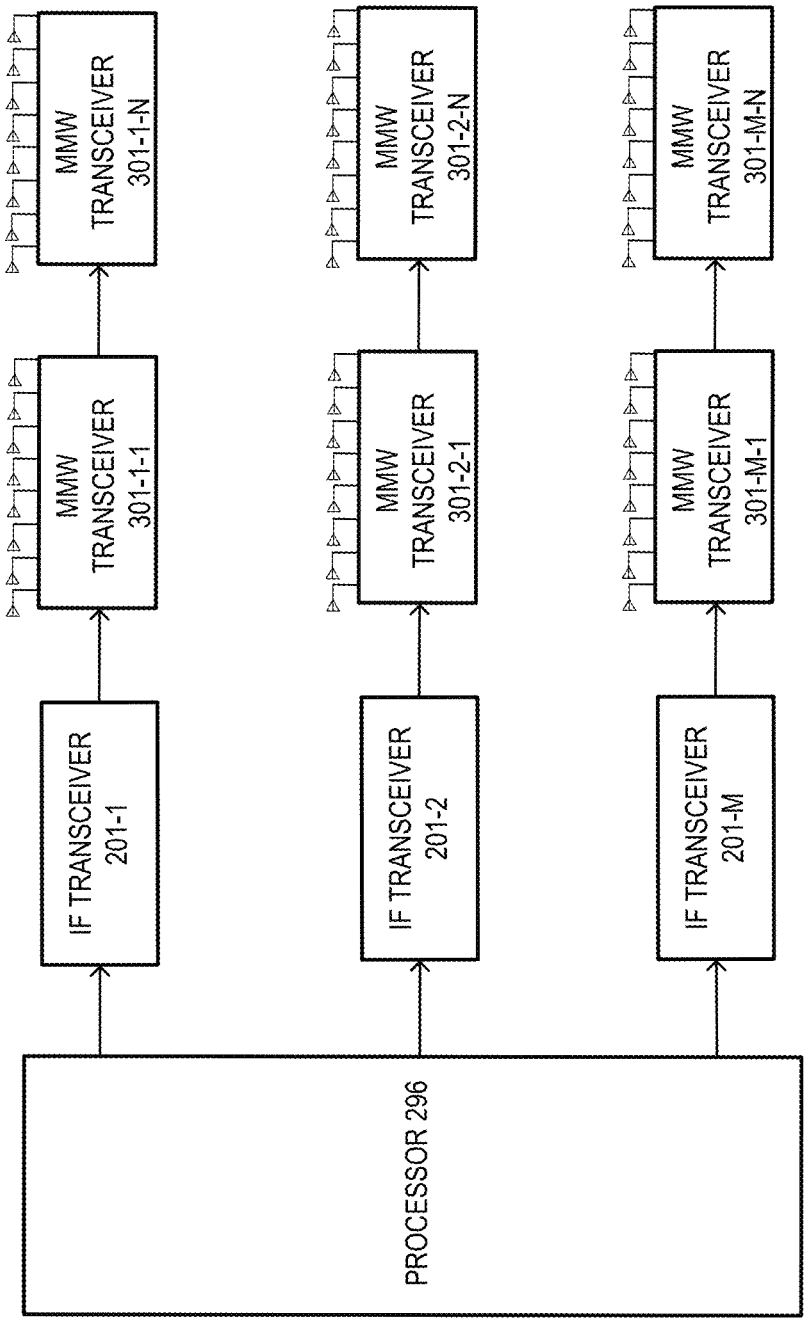
FIG. 2D is a block diagram illustrating aspects of a wireless device in which aspects of the present disclosure may be implemented.

FIG. 2D is a block diagram illustrating aspects of a wireless device in which aspects of the present disclosure may be implemented. The wireless device of FIG. 2D illustrates how multiple IF transceivers 201 and associated daisy chains of multiple mmW transceivers 201 can be combined to provide signal routing to any number of antenna elements to support a massive phase array in accordance with aspects described herein. As illustrated, a processor 296 (e.g., or any control circuitry) can be combined with any number of transceivers 201 (e.g., as described above for FIG. 2C). The example of FIG. 2D shows IF transceivers 201-1, 201-2, and 201-M. Each of the IF transceivers 201 has an associated set of mmW transceivers. IF transceiver 201-1 is associated with mmW transceivers 301-1-1 and 301-1-N. IF transceiver 201-2 is associated with mmW transceivers 301-2-1 and 301-2-N. IF transceiver 201-M is associated with mmW transceivers 301-M-1 and 301-M-N. If each mmW transceiver includes P antenna elements, then the illustrated wireless device supports M×N×P antenna elements. Such a routing structure can support hundreds, thousands, or any number of antenna elements in a massive antenna array. Such a structure improves the design of a device by reducing routing complexity when compared with a multi-stage 1:N splitter tree. The reduced complexity can improve the link budget performance of a design, and support coverage to meet 5G performance criteria for 5G customer terminal equipment, 5G radio area networks for small cells, and 5G radio area networks for base stations. While each chain is illustrated in FIG. 2D as having the same number of mmW transceivers 301, the number of mmW transceivers in each chain may vary.

Figure 3A:
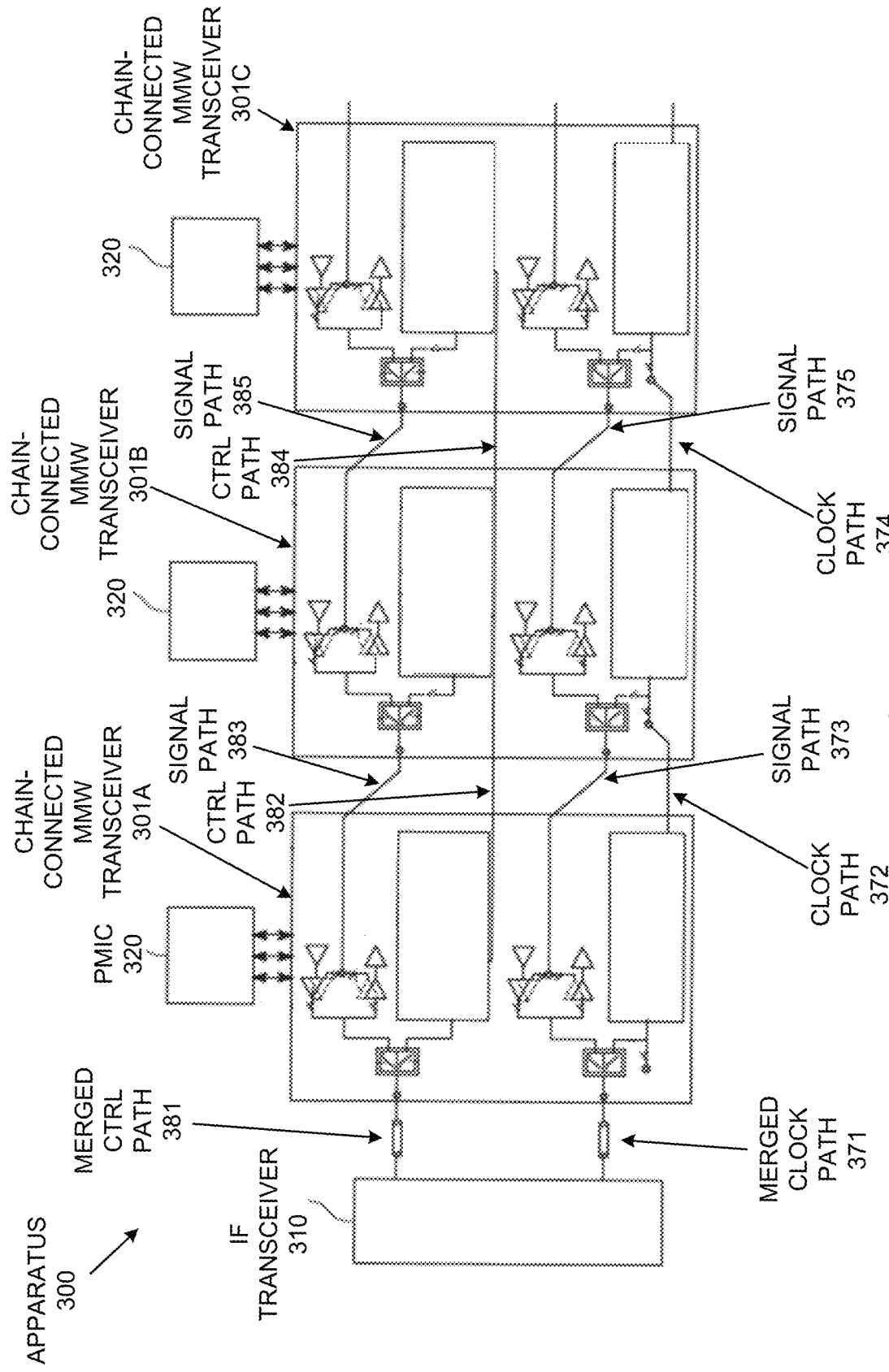
FIG. 3A is a diagram illustrating aspects of an apparatus including a chained signal routing for a large phase array in accordance with some aspects.
Figure 3B:
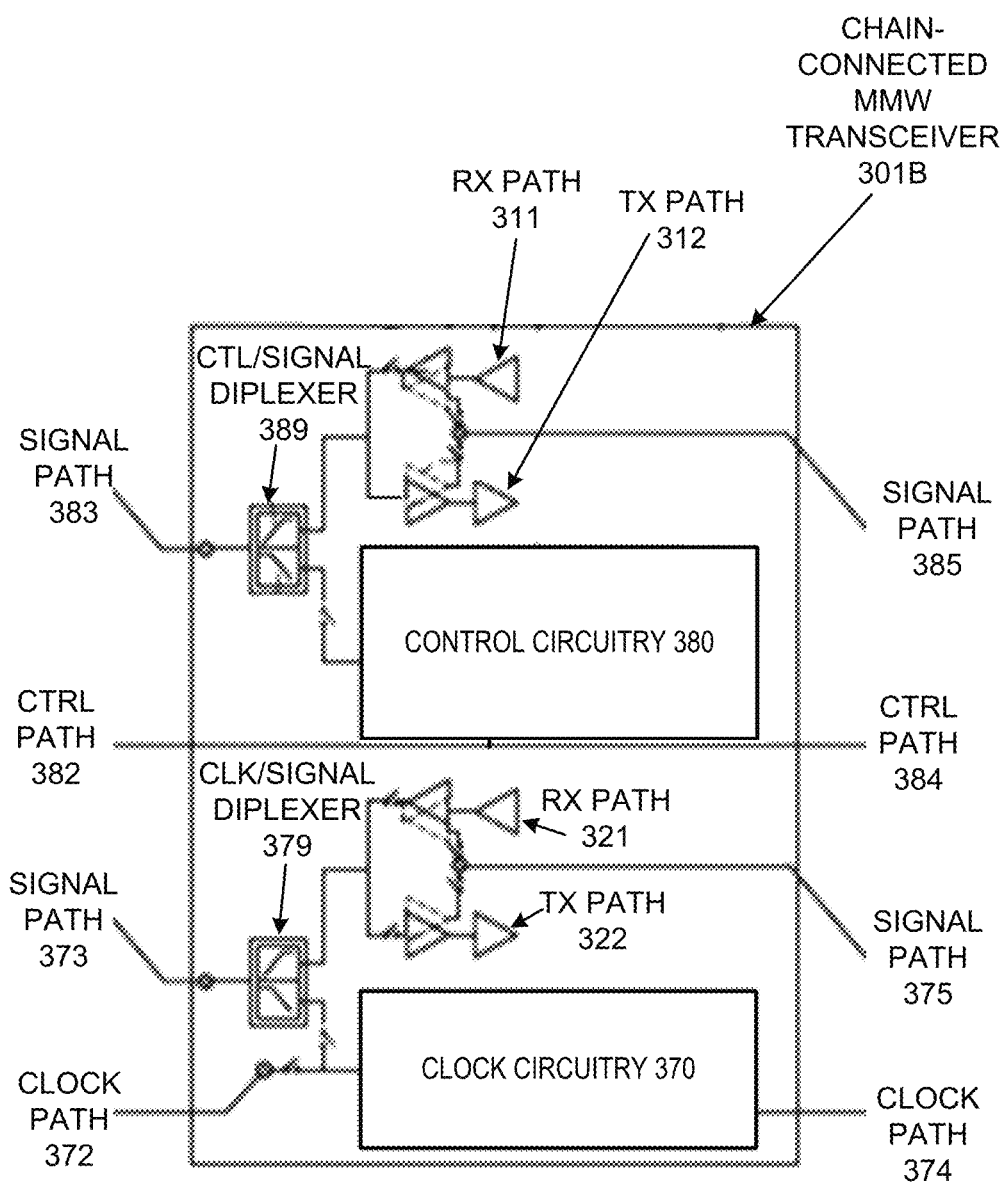
FIG. 3B is a diagram illustrating aspects of a mmW transceiver for use with a chained signal routing for a large phase array in accordance with some aspects.

FIG. 3A is a diagram illustrating aspects of an apparatus 300 including a chained signal routing for a large phase array in accordance with some aspects. FIG. 3B is a diagram illustrating aspects of a mmW transceiver 301 for use with apparatus 300 of FIG. 3A that includes a chained signal routing for a large phase array in accordance with some aspects.

FIG. 3A, similar to FIGS. 2C and 2D, includes an IF transceiver. The illustrated IF transceiver 310 has two paths (but may have more paths, as described above) connected to the chained routing for mmW transceivers 301A, 301B, and 301C, or more in similar methods. The two paths are merged control path 381, which is similar to merged control/signal path 204 of FIG. 2C, and merged clock path 371, which is similar to merged clock/signal path 207 of FIG. 2C. As described above, the two paths 204, 207 may be used for separate data, carriers, streams, channels, etc. to be communicated using the antenna(s) supported by IF transceiver 201 and mmW transceivers 301 in the chained routing illustrated by FIG. 3A. The two paths 371 and 381 connect IF transceiver 310 to an initial (e.g., master or first) chain-connected mmW transceiver 301A. The initial chain-connected mmW transceiver 301A includes circuitry to support both transmission and reception of signals that use paths 371 and 381, as well as circuitry to support relay of such signals between IF transceiver 310 and mmW transceivers 301 further down the daisy chain away from IF transceiver 310 (e.g., the mmW transceiver 301B and the mmW transceiver 301C, which may be considered secondary or slave mmW transceivers to the primary or master mmW transceiver 301A). While apparatus 300 is illustrated with three mmW transceivers 301A, 301B, and 301C, additional numbers of mmW transceivers can be used in other configurations. Additionally, as described above, IF transceiver 310 can have other connections similar to paths 371 and 381 to connect to additional chains of mmW transceivers.

In the example of FIG. 3A, the routing path of the chain connected mmW transceivers 301 connects from the path 381 through the mmW transceiver 301A to separate signal path 383 and control path 382. In the example of FIG. 3A, the merged signal from merged control path 381 that includes both a data signal and a control signal is split inside of the mmW transceiver 301A, and separate paths are used for the signal and control data communicated between the mmW transceiver 301A and the mmW transceiver 301B. The signal path carries data signals between the mmW transceiver 301B and the mmW transceiver 301A, and the control path 382 carries a control signal between the mmW transceiver 301B and the mmW transceiver 301A. Similarly, data from the merged clock path 371 is separated inside of the chain-connected mmW transceiver 301A. The data can be communicated to the chain-connected mmW transceiver 301B using signal path 373 and clock path 372. The two separate data signals, the clock signal, and the control signal can be conveyed down the daisy chain routing separately in any number of subsequent chain-connected transceivers after the initial chain connected mmW transceiver 301 (e.g., using signal paths 385, 375, control path 384, clock path 374, and similar paths for any subsequent mmW transceivers away from IF transceiver 310 in the daisy chain routing).

In addition to the daisy chain connection to the IF transceiver 310, each mmW transceiver 301 of the chain of mmW transceivers may be associated with a separate power management integrated circuit (PMIC) 320. The PMICs 320 provide reference voltages and current to support amplifiers and power both for transmission and reception of signals using antennas for each individual mmW transceiver 301, as well as to compensate for losses in the data, control, and clock signals as the signals pass along the daisy chain of the chain-connected mmW transceivers 301. While apparatus 300 is illustrated with each mmW transceiver pairing with a PMIC chip, it is possible to pair one PMIC with more than one mmW transceivers to save cost especially for massive phase array system. For example, one or more reference voltages may be communicated though the chain of mmW transceivers, and power management circuitry within each transceiver may convert the reference voltages to voltages required in the transceiver.

FIG. 3B is a diagram illustrating aspects of a mmW transceiver 301 for use with apparatus 300 of FIG. 3A that includes a chained signal routing (e.g., including the chain-connected mmW transceivers 301A, 301B, 301C) for a large phase array in accordance with some aspects. FIG. 3B illustrates the chain-connected mmW transceiver 301B of FIG. 3A. The illustrated transceivers 301A, 301B, 301C are shown as duplicates, so that even if some elements are not used due to the particular configuration, the below description of the chain-connected mmW transceiver 301B can be extrapolated to any transceiver in a daisy chain, including the first mmW transceiver in the chain (e.g., the mmW transceiver 301A).

As shown in FIG. 3B and also FIG. 3A, the chain connected mmW transceiver 301B has connections to a previous and a subsequent mmW transceiver in the daisy chain. The connections to the previous mmW transceiver (e.g., mmW transceiver 301A) include signal path 383, control path 382, signal path 373, and clock path 372. The connections to the subsequent mmW transceiver in the chain (e.g., mmW transceiver 301C) include the signal path 385, the control path 384, the signal path 375, and the clock path 374. As a secondary (e.g., slave, subsequent, etc.) mmW transceiver, signal path 383 will be used only for data signals, and control signals are received via the control path 382. If transceiver 301B was the primary (e.g., first, master, etc.) transceiver, the signal path 383 would include a combined data and control signal that would be split by control/signal diplexer 389. Because the control and data signals for such a combination are different frequencies, the diplexer 389 can be a simple passive diplexer that splits the signals of different frequencies along separate paths. The upper illustrated path is connected to Tx and Rx paths for antennas connected to the mmW transceiver 301B. The lower path is attached to control circuitry 380. When the control signal is received via control path 382 or control path 384, the signal is coupled directly to the control circuitry 380 as shown. In alternate embodiments, for receive path signals, the control/signal diplexer 389 can similarly be used to combine data and control signals into a combined control/data signal for communication to an IF transceiver if the mmW transceiver 301B is the primary transceiver in a chain. The data signal communicated via signal path 383 can either be connected to signal path 385, if the signal is to or from a subsequent mmW transceiver 301 further along the chain (e.g., the mmW transceiver 301C), or to Rx path 311 or Tx path 312 for signals transmitted or received using the antenna elements directly coupled to the chain connected mmW transceiver 301B.

Figure 4:
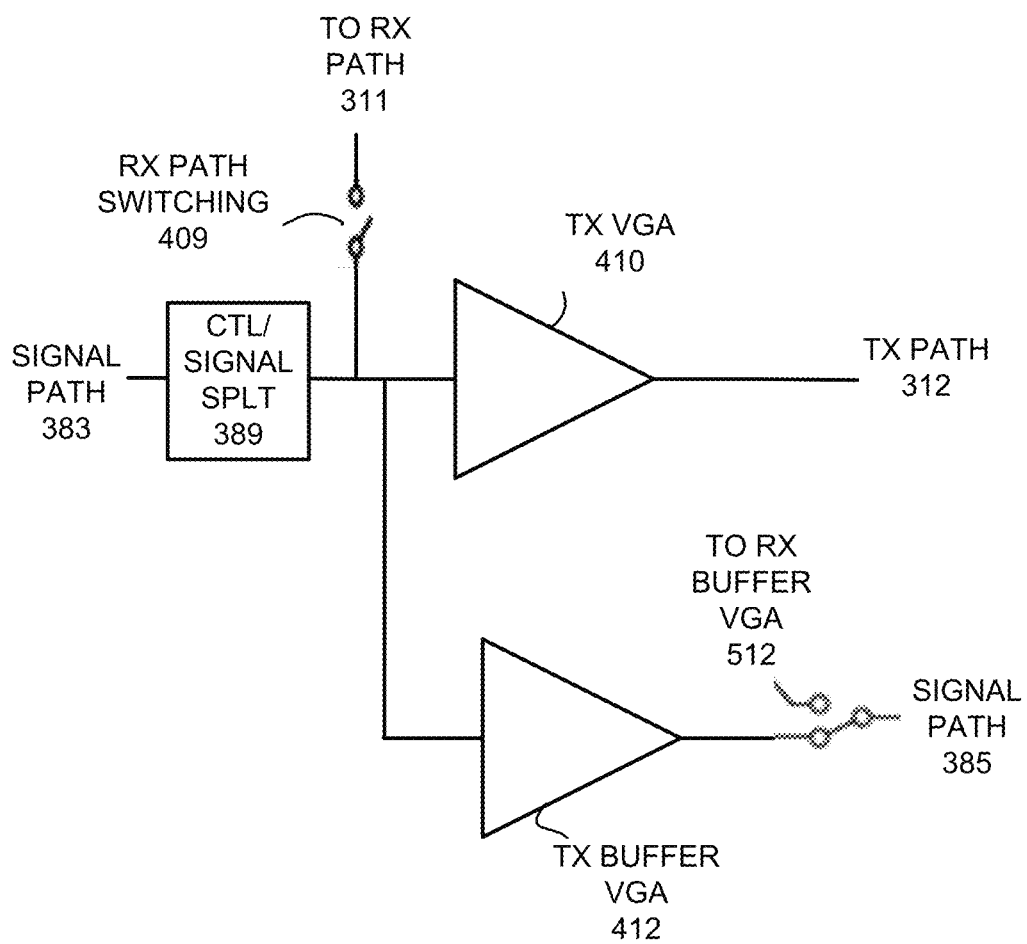
FIG. 4 is a diagram illustrating aspects of a transmit (Tx) path in a mmW transceiver for use with a chained signal routing for a large phase array in accordance with some aspects.
Figure 5:
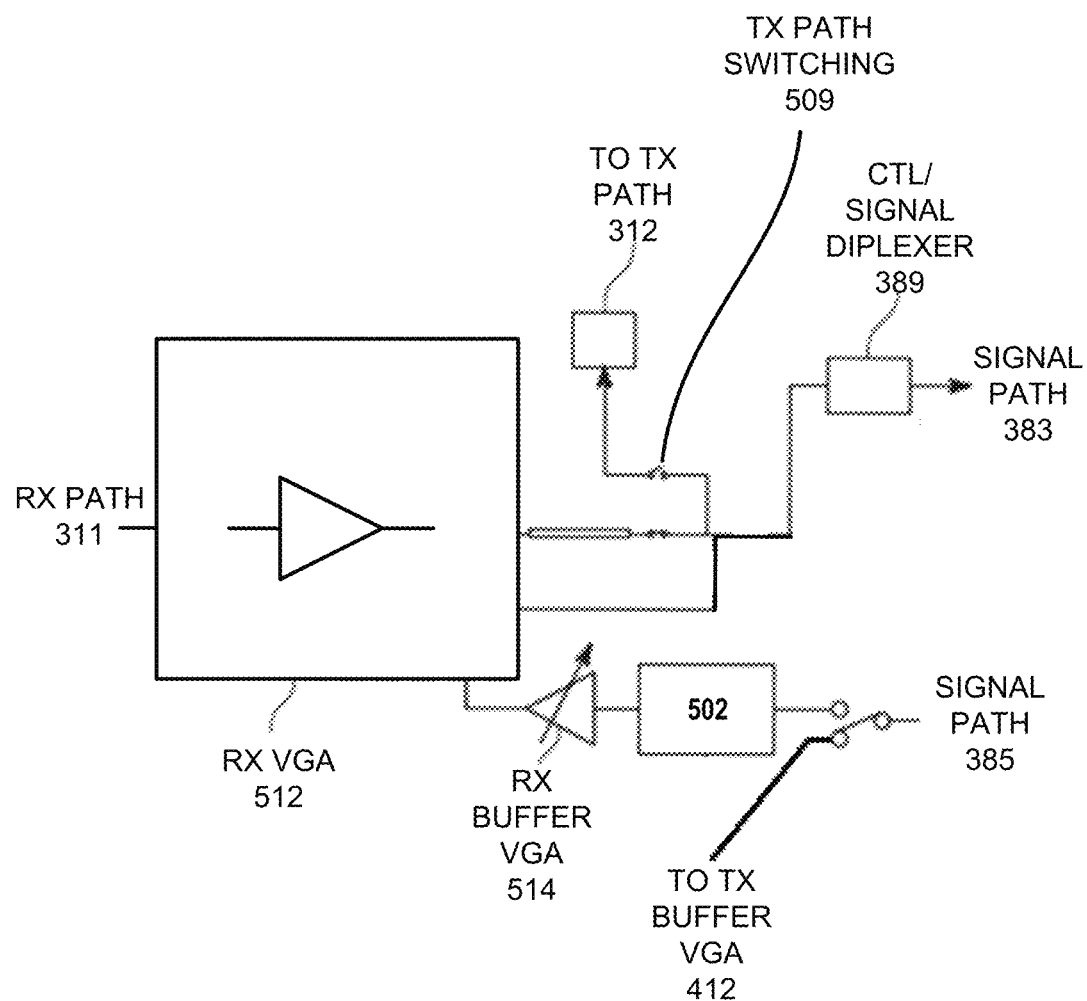
FIG. 5 is a diagram illustrating aspects of a receive (Rx) path in a mmW transceiver for use with a chained signal routing for a large phase array in accordance with some aspects.

The signal path 373 and the clock path 372 are similarly connected to a clock/signal diplexer 379 and clock circuitry 370. The clock circuitry 370 can be used for managing signals transmitted and received using the antennas coupled directly to the transceiver 301B (e.g., for mixers such as mixers 276, 286), and can be used to refresh or otherwise manage and distribute the clock signal up and down the daisy chain routing. Both data paths through chain connected transceiver have three connections: a signal path connection for conveying signals up and down the daisy chain routing (e.g. via signal path 385 or signal path 375); a receive path for signals received at antenna elements connected to the mmW transceiver 301B (e.g., Rx path 311 and Rx path 321); and a transmit path for signals transmitted using antenna elements directly connected to the mmW transceiver 301B (e.g., Tx path 312 and Tx path 322), which may be selectively coupled together via one or more switches or other means. FIG. 4 below illustrates an example implementation of Tx paths 312, 322. FIG. 5 below illustrates an example implementation of Rx paths 311, 321. The Tx path 312 and Rx path 311 may be coupled to the same antenna or array of antennas. Similarly, the Tx path 322 and Rx path 321 may be coupled to another antenna or array of antennas. A mixer, amplifier, phase shifter, filer, splitter and/or combiner, transformer, and/or other components may be coupled between each of the Tx and Rx paths and its respective antenna or array. FIGS. 6B and 6C illustrate certain of these components, but other configurations may be used.

FIG. 4 is a diagram illustrating aspects of a transmit (Tx) path (e.g., Tx path 312 or Tx path 322) in a mmW transceiver for use with a chained signal routing for a large phase array in accordance with some aspects. As shown, the circuitry of FIG. 4 illustrates routing for signals from the signal path 383 of FIGS. 3A and 3B to the Tx path 312 and the signal path 385. Additional switching or isolation circuitry may be present to manage signals along such paths, but are not shown for simplicity. As illustrated in FIGS. 3A and 3B, duplicate circuitry or other circuitry similar to the illustrated circuitry of FIG. 4 can be used for both data paths in any mmW transceiver 301.

As shown, the circuitry is connected to the signal path 383 and the control/signal diplexer 389 described above (a path for control data to or from the diplexer 389 is not shown in FIGS. 4 and 5 for ease of illustration). The data output of the control/signal diplexer 389 can be coupled to the Rx path 311, circuitry for the Tx path 312, and circuitry for the signal path 385. For transmit data to be transmitted using the antenna elements coupled to the circuitry illustrated in FIG. 4, the transmit data will be received at the control/signal diplexer 389, and the switching for the Rx path 311 (not illustrated in FIG. 4, but shown in FIG. 5 to ensure clarity) and the signal path 385 will be in an open/isolated position. The transmit data will be amplified by the Tx variable gain amplifier (VGA) 410, and then passed along the Tx path 312.

For transmit data indicated to be passed further along the daisy chain routing, Rx path switching 409 (e.g., switching for the Rx path 311, see FIG. 4) and Tx path switching 509 for the Tx VGA 410 (see FIG. 5) will be open/isolated, and the Tx buffer VGA 412 will be connected to the output of the control/signal diplexer 389. The Tx buffer VGA 412 is used to compensate for losses along the daisy chain routing, and then passes the signal through switching to the signal path 385. The transmit data can be passed through multiple chains of such Tx buffers in the daisy chain routing to a mmW transceiver 301 associated with the transmit data by the control data. The switching between the Tx buffer VGA 412 and the signal path 385 includes switching to connect signal path 385 to both the Tx Buffer VGA 412, as well as to an Rx buffer VGA 512 for receive signals sent up the daisy chain routing as described in FIG. 5.

FIG. 5 is a diagram illustrating aspects of a receive (Rx) path 311 in the mmW transceiver 301B for use with a chained signal routing for a large phase array in accordance with some aspects. As described above, both the Rx Buffer VGA 514 and the Tx buffer VGA 412 can be connected to the signal path 385 via switching circuitry. The switching circuitry allows the signal path 385 to connect to Tx buffer VGA 412 when signals are being transmitted down the daisy chain routing to mmW transceivers further down the chain, and to connect to Rx buffer VGA 514 via matching circuitry 502 when received signals are being transmitted up the daisy chain toward an IF transceiver. In the illustrated circuitry of FIG. 5, such a receive signal being transmitted up the daisy chain is input to signal path 385 from another mmW transceiver (e.g., the mmW transceiver 301C). The matching circuitry 502 then provides the signal to Rx buffer VGA 514, which can compensate for signal losses from signal path 385 or other parts of the daisy chain routing. The receive signal is then provided to the control/signal diplexer 389 and passed further up the chain via the signal path 383.

Just as described above in FIGS. 4 and 5, the Tx path 312 is connected to the Rx path, and switching circuitry (e.g., the Rx path switching 409 and the Tx path switching 509) can be used to isolate these paths depending on the path that is in use, or to isolate these local antenna element Tx/Rx paths from the daisy chain routing when signals are passed up and down the daisy chain. When a signal is received at antennas of the transceiver containing the circuitry of FIG. 5 (e.g., the mmW transceiver 301B), the signal is processed via circuitry (e.g., such as the transmitter 230 or receiver 250 circuitry described in FIG. 2B), and then passed to the Rx VGA 512 via the Rx path 311. The received signal is then passed to the control/signal diplexer 389 and passed toward the IF transceiver via the path 383. Just as for the transmit path, a mmW transceiver such as the chained mmW transceiver 301B can include two copies of the circuitry of FIG. 4, with one copy using the control/signal diplexer 389, and the other copy using a clock diplexer (e.g., the clock diplexer 379) and an associated separate path. In other examples, different circuitry can be used to manage the different data signals, clock signal(s), and control signal(s) to compensate for routing losses, signal integrity, and to provide signals up and down the daisy chain with adequate signal quality to be processed in the communication system.

Figure 6A:
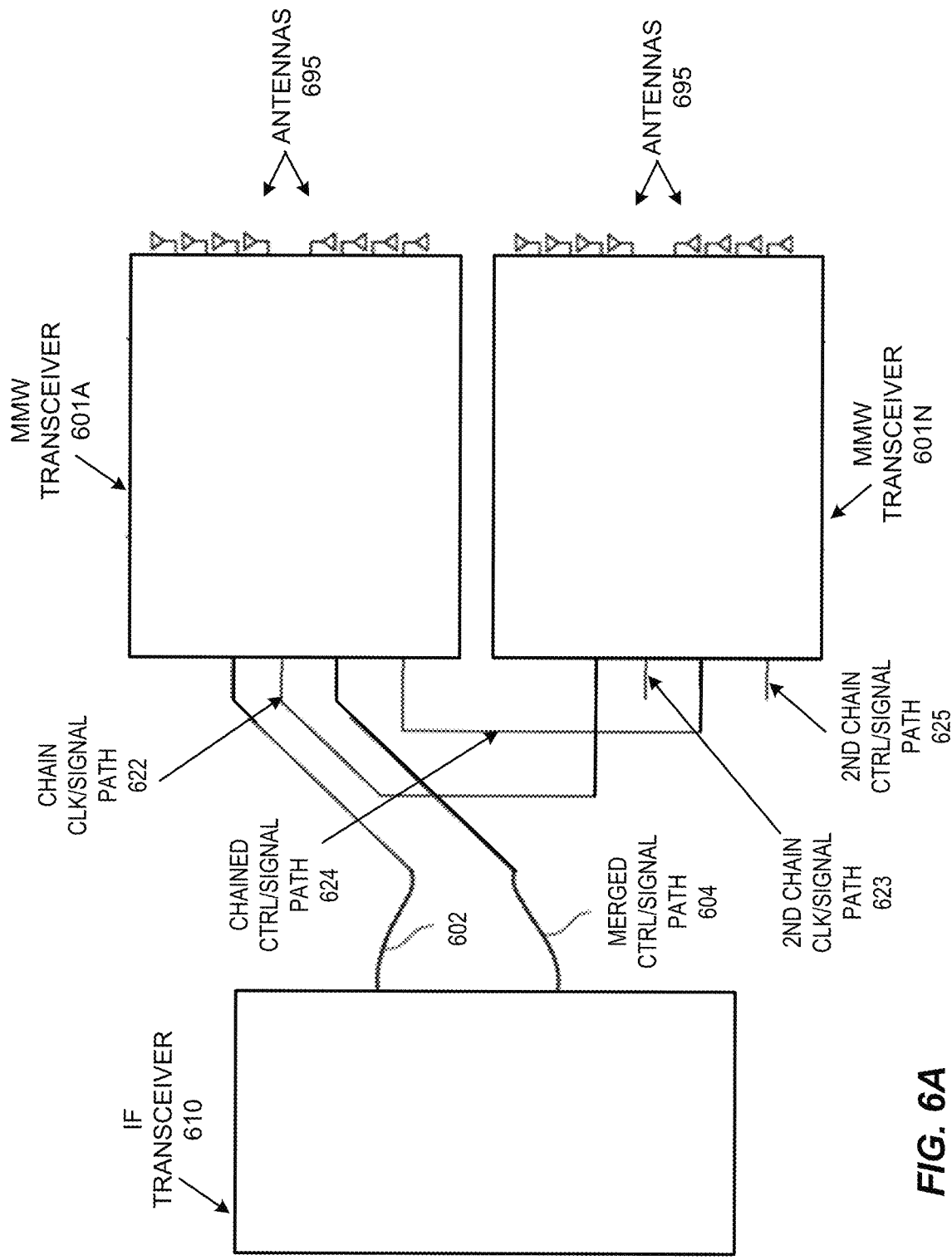
FIG. 6A is a diagram illustrating aspects of an apparatus including a chained signal routing for a large phase array in accordance with some aspects.
Figure 6B:
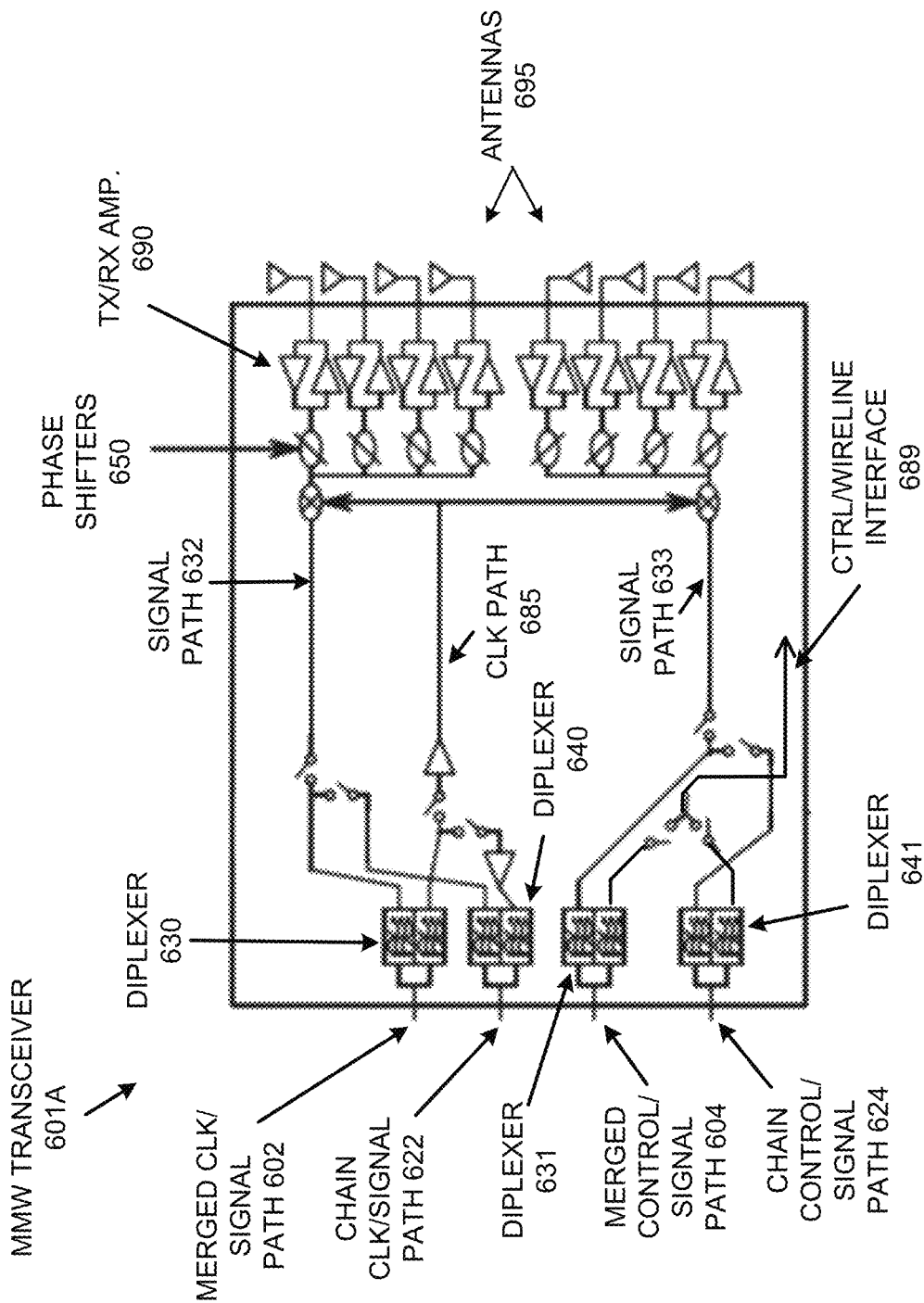
FIG. 6B is a diagram illustrating aspects of a mmW transceiver for use with a chained signal routing for a large phase array in accordance with some aspects.
Figure 6C:
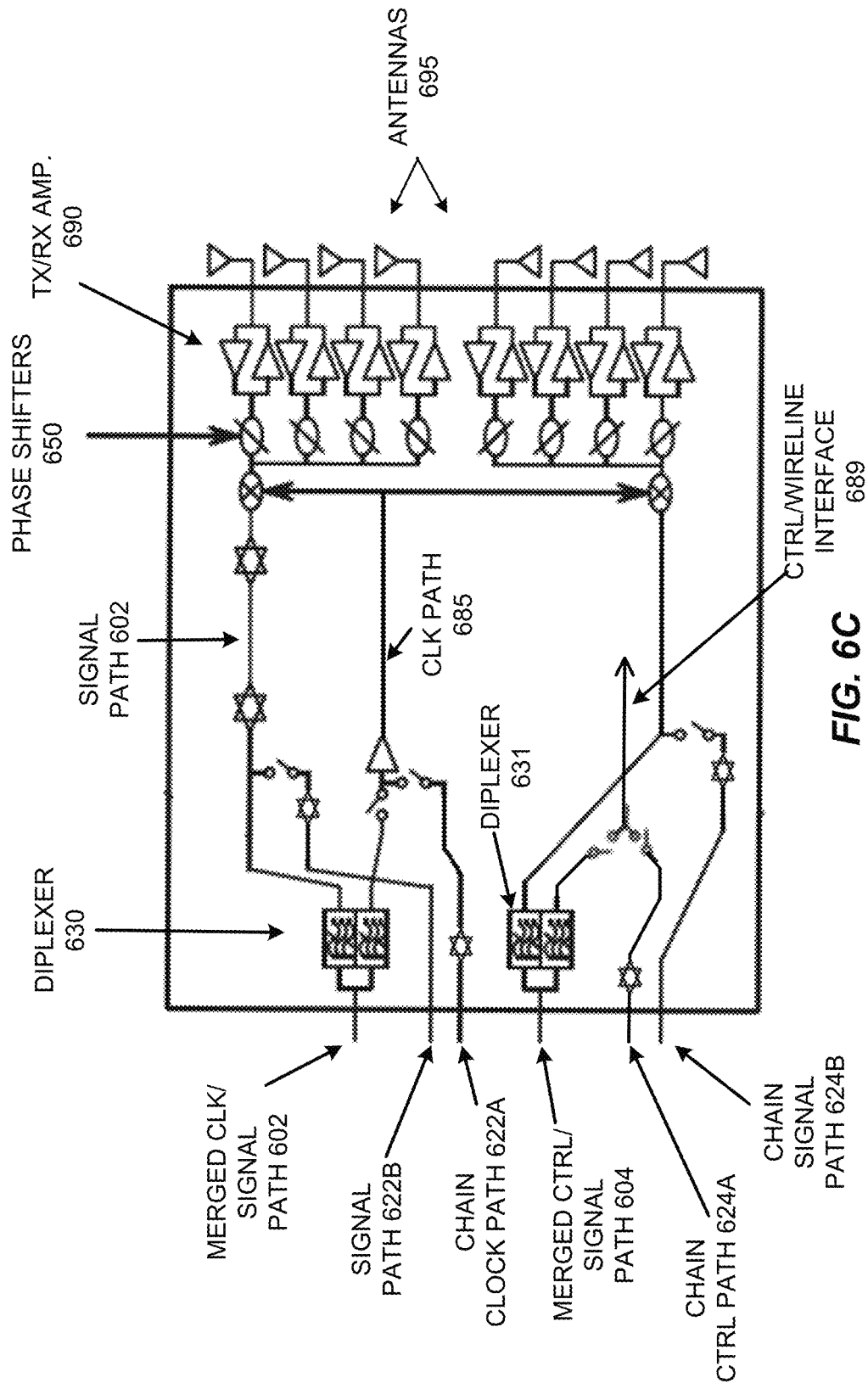
FIG. 6C is a diagram illustrating aspects of a mmW transceiver for use with a chained signal routing for a large phase array in accordance with some aspects.

FIG. 6A is a diagram illustrating aspects of an apparatus including a chained signal routing for a phase array (e.g., a large phase array) in accordance with some aspects. In the implementations illustrated in FIGS. 3A-B, 4, and 5, the merged clock/data signals and merged control/data signals are split at the primary mmW transceiver, and the clock, control, and two data signals are then passed up or down the daisy chain separately. FIG. 6A illustrates an implementation where, rather than passing these signals up or down the chain separately, the signals are passed together. Other aspects of the apparatus can operate as described above, with merged signals provided to and from an IF transceiver in a merged format via merged clock/signal path 602 and merged control/signal path 604. Signals can then be passed up (e.g., Rx signals) or down (e.g., Tx signals) the chain connecting multiple mmW transceivers 601A-601N via chain path 622, chain path 624, second chain path 623, and second chain path 625. Signals received at antennas 695 of one or more mmW transceivers 601A-601N are passed up the chain to the IF transceiver 610, and signals to be transmitted using the antennas 695 of one or more mmW transceivers are passed down the daisy chain to the assigned mmW transceiver from mmW transceivers 601A-601N (e.g., mmW transceiver 601N) for transmission using the corresponding antennas 695 for the designated transceiver(s).

FIG. 6B is a diagram illustrating aspects of a mmW transceiver for use with a chained signal routing for a (large) phase array in accordance with some aspects. FIG. 6B illustrates an example implementation of a transceiver 601A different than the implementation(s) described in FIGS. 3B, 4, and 5. In the example of FIG. 6B, the mmW transceiver 601A is configured to receive combined transmit data signals at merged clock/signal path 602 and merged control/signal path 604. The corresponding merged transmit signals from each path are split at diplexers 630 and 631. In contrast to the examples above, when the signals are designated to be passed down the daisy chain rather than transmitted via the antennas 695 for the mmW transceiver 601A (e.g., via phase shifters 650 and Tx/Rx amplifiers 690), the signals are recombined at diplexers 640 and 641. The signals that are remerged within the mmW transceiver 601A using diplexers 640 and 641 are then communicated down the daisy chain routing via the chain clock/signal path 622 and the chain control/signal path 624. Receive signals follow the opposite path, with the combined signals received via the chain control/signal path 624 and the chain clock/signal path 622. The receive signals follow the reverse of the transmit signals, and the signals are similarly split and recombined within the mmW transceiver 601A before passing up the daisy chain routing to an IF transceiver such as the IF transceiver 610.

At the mmW transceiver where signals are transmitted, switching circuitry coupled to diplexers 630 and 631 route the signals along signal paths. This includes a route from a data terminal of diplexer 630 and a route from a data terminal of diplexer 631 to antennas 695 using phase shifters 650 and amplifiers 690. While signal path phase shifting is illustrated herein, those of skill in the art will understand that phase shifting may be accomplished by instead shifting an LO and/or mixer signal (in this figure and in other figures, such as FIGS. 3A, 3B, 6C). The clock signal from the merged clock/signal path 602 is coupled to a clock signal terminal and output from a clock terminal of diplexer 631 to be provided to circuitry to manage timing of the data signals and/or conversion of data signals between IF and RF (e.g., provided to mixers in the mmW transceiver 601A or to circuitry configured to generate an LO input(s) for the mixers based on the clock signal). The control signal from merged control signal path 604 is provided to a control signal terminal of diplexer 631 and output from a control terminal of diplexer 631 to control/wireline interface 689 to manage transmission of the data signals. For example, the interface 689 may be configured to adjust the phase shifters 650, set one or more switches in the mmW transceiver 601A, set the gain of one or more amplifiers (e.g., any of the amplifiers 690) in the transceiver 601A, etc. For received signals, the antennas 695 receive the signals which are amplified by amplifiers 690. Additional circuitry then manages the data, clock, and control signals for conveyance up the daisy chain via signal paths 632 and 633.

FIG. 6C is a diagram illustrating aspects of a mmW transceiver for use with a chained signal routing for a (large) phase array in accordance with some aspects. Similar to the device of FIG. 6B, the device of FIG. 6C communicates merged signals at merged signal paths 602 and 604 when the device is an initial mmW transceiver. Diplexers 630 and 631 split any merged signals received from up the daisy chain (e.g., toward an IF transceiver) and merge any split signals to be sent directly to an IF transceiver. Signals communicated using antennas 695 are routed to phase shifters 650 and TX or RX amplifiers 690, e.g., based on control data from control/wireline interface 689 with timing managed by the clock signal on clock path 685. Devices not connected to the IF transceiver (e.g., in a middle of a daisy chain) communicate data, control, and clock signals separately using paths 602, 604, 622A, 622B, 624A, and 624B. In contrast to the device of FIG. 6B, the device of FIG. 6C does not remerge data and control or clock signals prior to communicating the signals up or down the daisy chain, unless the signals are being passed to the IF transceiver. Merged signals split at diplexers 630 and 631 when the device of FIG. 6C is the first mmW transceiver in a chain are thus communicated down the daisy chain (e.g., away from the IF transceiver) separately using signal paths 622B, 624B, and separate clock path 622A and control path 624A. For example, if the device is a $2^{nd}$ or additional mmW transceiver in a daisy chain, the control signal is received as a stand-alone signal via chain control path 624A. For the first mmW transceiver in such a daisy chain, a data signal to be passed to the second mmW transceiver (e.g., away from the IF transceiver 610) is output from the signal paths 622B and 624B of the first mmW transceiver and then input to the corresponding signal paths 622B and 624B of the second mmW transceiver.

Daisy chain routing architectures described herein may improve devices using such an architecture by avoiding the loss associated with splitters, and by reducing the number of independent IF transceiver ICs, e.g., by a factor associated with the number of mmW transceivers in a daisy chain. For example, if two mmW transceivers are used in a daisy chain, the number of IF transceiver ICs may be cut in half. For a 32×32 antenna array, the number of IF transceiver ICs may be cut from 16 to 8, reducing space usage of the device and providing a corresponding improvement to the device associated with the reduced number of IF transceiver ICs. Additionally, as described above, using multiplexing and demultiplexing diplexers on the mmW transceiver reduces path loss (e.g., by ~4 dB from a 1:2 splitter, etc.) and allows for corresponding improvements in signal to noise ratios. Such an approach can further reduce the number of elements for a common RFIC design for UE and CPE, which otherwise come with an area and current consumption penalty (e.g., due to the 1:3 splitter used at IF connection ports). Further, such aspects allow increased device design flexibility using a daisy chain when compared with the 1:2 or 1:4 splitter configuration, e.g., in an environment where routing mm-wave signals more than a few millimeters results in large losses.

Figure 7A:
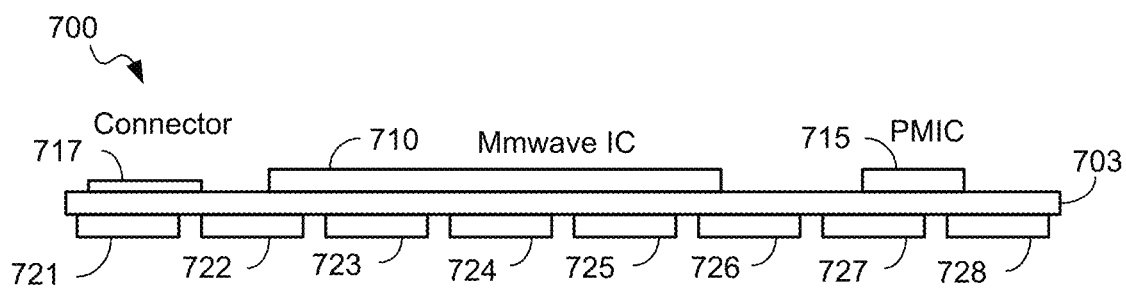
FIGS. 7A and 7B are block diagrams illustrating a mmW module in accordance with aspects of the disclosure.
Figure 7B:
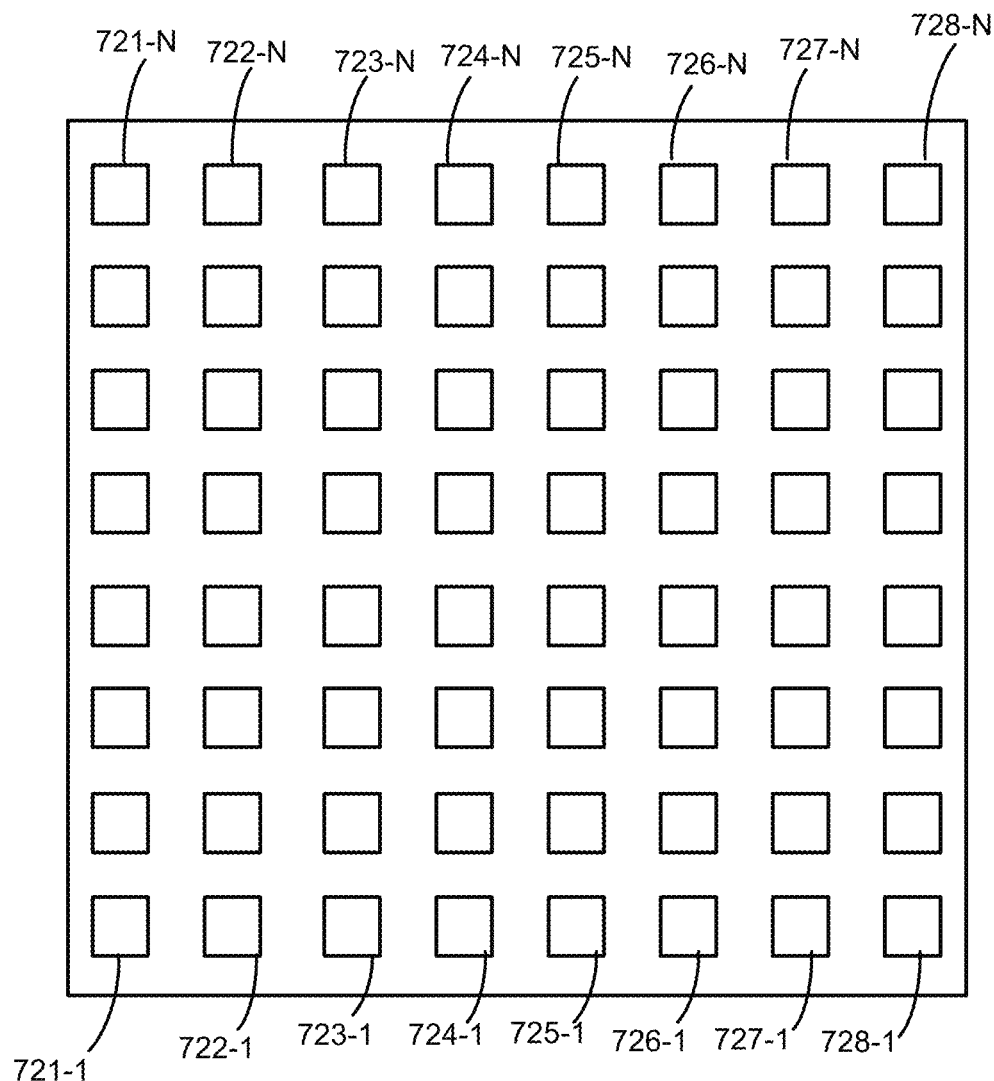

FIGS. 7A and 7B are block diagrams collectively illustrating some aspects of a millimeter wave (mmW) module in accordance with some aspects of the disclosure. The circuitry above illustrates mmW elements that can be disposed in a mmW module (e.g., on a mmW PCB and/or in a mmW IC). The elements of the mmW module can include mmW transceivers as described in FIGS. 2D, 3A-B, 4, 5, and 6A-C, as well as antenna elements used in large antenna arrays as described throughout the specification. Such mmW elements can also include chained signal path routings in accordance with the descriptions herein.

FIG. 7A shows a side view of a millimeter wave (mmW) module 700. The mmW module 700 may be an example of the mmW modules used for mmW transceivers, PMICs, and other such mmW elements described herein. In some aspects, the mmW module 700 may comprise a massive phased array fabricated on a substrate 703. Such a massive phase array module can include any number of antenna elements (e.g., 64 elements, 128 elements, 1024 elements, etc.). In some aspects, the mmW module 700 may comprise a mmWIC 710, a PMIC 715, a connector 717 and a plurality of antennas in an array. The side view of FIG. 7A shows columns of antennas 721, 722, 723, 724, 725, 726, 727 and 728 fabricated on a substrate 703, a mmWIC 710, a PMIC 715, and a connector 717. FIG. 7B is a top view of the mmW module 700 showing a plurality of antennas 721-1 through 721-N, 722-1 through 722-N, 723-1 through 723-N, 724-1 through 724-N, 725-1 through 725-N, 726-1 through 726-N, 727-1 through 727-N and 728-1 through 728-N on the substrate 703. In other aspects, a mmW module 700 can have other numbers of antennas in other organizations besides the 8×8 grid illustrated in FIG. 7B (e.g., 1×8, 16×16, 4×6, 8×16, etc.). Other aspects include devices where the mmW module may comprise a plurality of antennas of an array on separate PCBs mounted to a main mmW PCB. In some examples, the antennas illustrated in FIG. 7B may be supported by a plurality of mmW transceivers. For example, each column of antennas may be supported by an IF transceiver and a plurality of chained mmW transceivers, each of which drives or receives from a subset of antennas in the column. In another example, one IF transceiver supports all of the antennas illustrated in FIG. 7B, and is coupled to a daisy-chained plurality of mmW transceivers, each of which drivers or receives from the antennas in a respective column.

Figure 8:
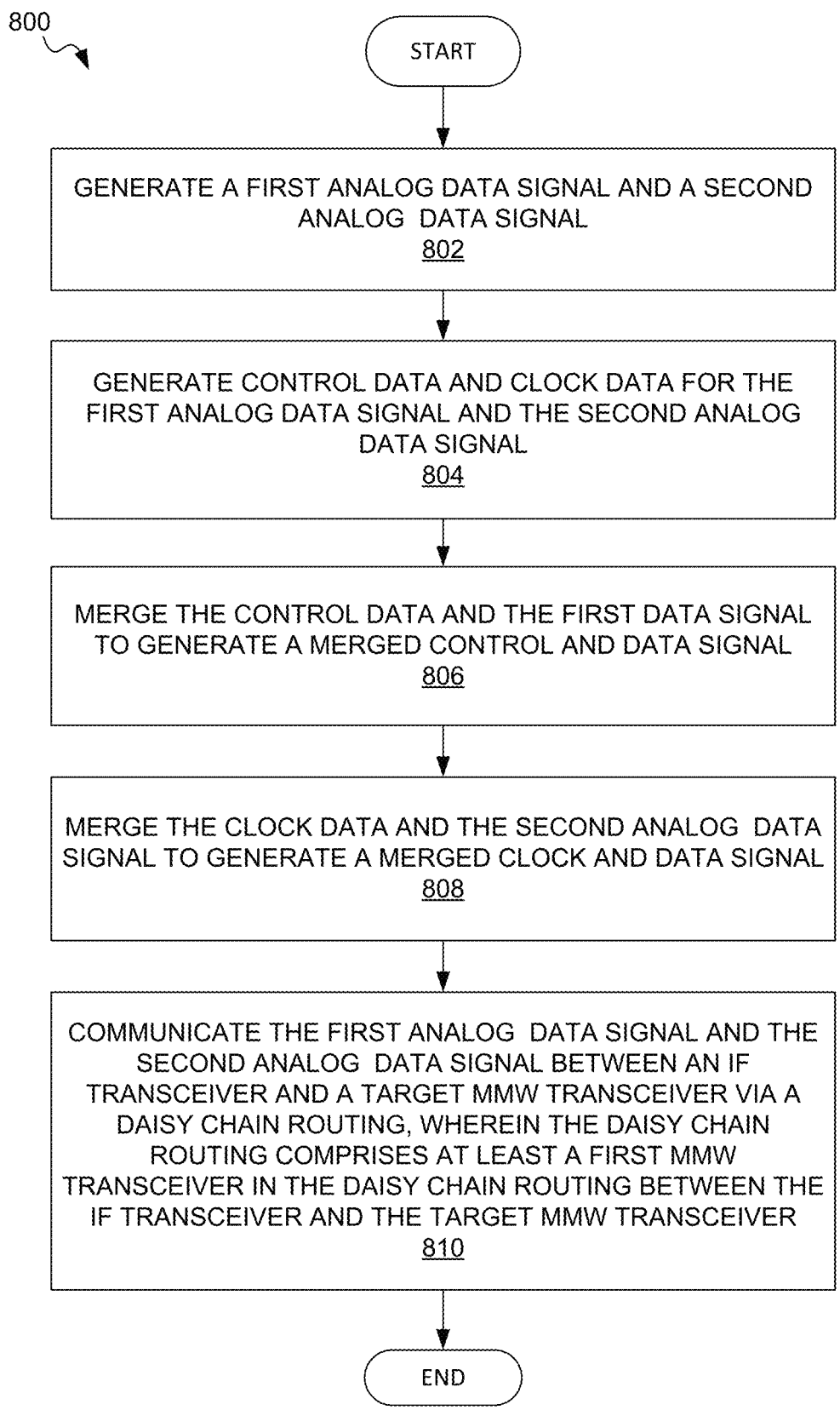
FIG. 8 is a flow diagram describing an example of the operation of a method for operation of a device including a chained signal routing for a large phase array in accordance with some aspects.

FIG. 8 is a flow diagram describing an example of the operation of a method 800 for operation of a device including a chained signal routing for a large phase array in accordance with some aspects. The blocks in the method 800 can be performed in or out of the order shown, and in some embodiments, can be performed at least in part in parallel.

Method 800 includes block 802, which involves generating a first analog data signal and a second analog data signal. The analog data signals can be generated by a digital to analog converter (e.g., the DAC 214a and 214b) from first and second digital data signals received from a processor (e.g., the processor 296) or memory (e.g., the memory 298) of a device.

Method 800 includes block 804, which involves generating control data and clock data for the first analog data signal and the second analog data signal. The clock data can be generated by clock circuitry in the IF transceiver, and the control data can be generated by control circuitry for the wireless communication system (e.g., the processor 296).

Method 800 includes block 806, which involves merging, by an IF transceiver (e.g., the diplexers 299 of IF transceiver 201), the control data and the first analog data signal to generate a merged control and data signal.

Method 800 includes block 808, which involves merging, by the IF transceiver (e.g., the diplexers 299 of IF transceiver 201), the clock data and the second analog data signal to generate a merged clock and data signal.

Method 800 includes block 810, which involves communicating the first analog data signal and the second analog data signal between the IF transceiver and a target mmW transceiver via a daisy chain routing, wherein the daisy chain routing comprises at least a first mmW transceiver in the daisy chain routing between the IF transceiver and the target mmW transceiver.

In some aspects, operations of block 810 can involve splitting the merged control and data signal using a first diplexer of a first mmW transceiver between the IF transceiver and the target mmW transceiver; splitting the merged clock and data signal using a second diplexer of a first mmW transceiver between the IF transceiver and the target mmW transceiver; and routing, by the first mmW transceiver, the clock signal, the control signal, the first analog data signal, and the second analog data signal to the target mmW transceiver.

Method 800 describes transmit operations in a device including a daisy chain routing for mmW communications. Corresponding blocks will be apparent for receive operations performable by the same device. In some aspects, a method for such receive operations can involve receiving a third analog data signal, a fourth analog data signal, a second control signal, and a second clock signal at one or more antennas of the target mmW transceiver; and downconverting the third analog data signal and the fourth analog data signal from mmW frequencies to IF frequencies using frequency conversion circuitry of the target mmW transceiver. Some such aspects further involve communicating the third analog data signal, the fourth analog data signal, the second control signal, and the second clock signal to the first mmW transceiver from the target mmW transceiver; merging, by a first diplexer of the first mmW transceiver, the second control signal and the third analog data signal to generate a second merged control and data signal; and merging, by a second diplexer of the first mmW transceiver, the clock data and the fourth analog data signal to generate a second merged clock and data signal. Some such aspects further involve communicating the second merged control and data signal and the second merged clock and data signal from the first mmW transceiver to the IF transceiver; converting the third and fourth analog data signals to third and fourth digital data signals using an analog to digital converter coupled to the IF transceiver; and processing the third and fourth digital data signals using a processor coupled to the analog to digital converter.

Figure 9:
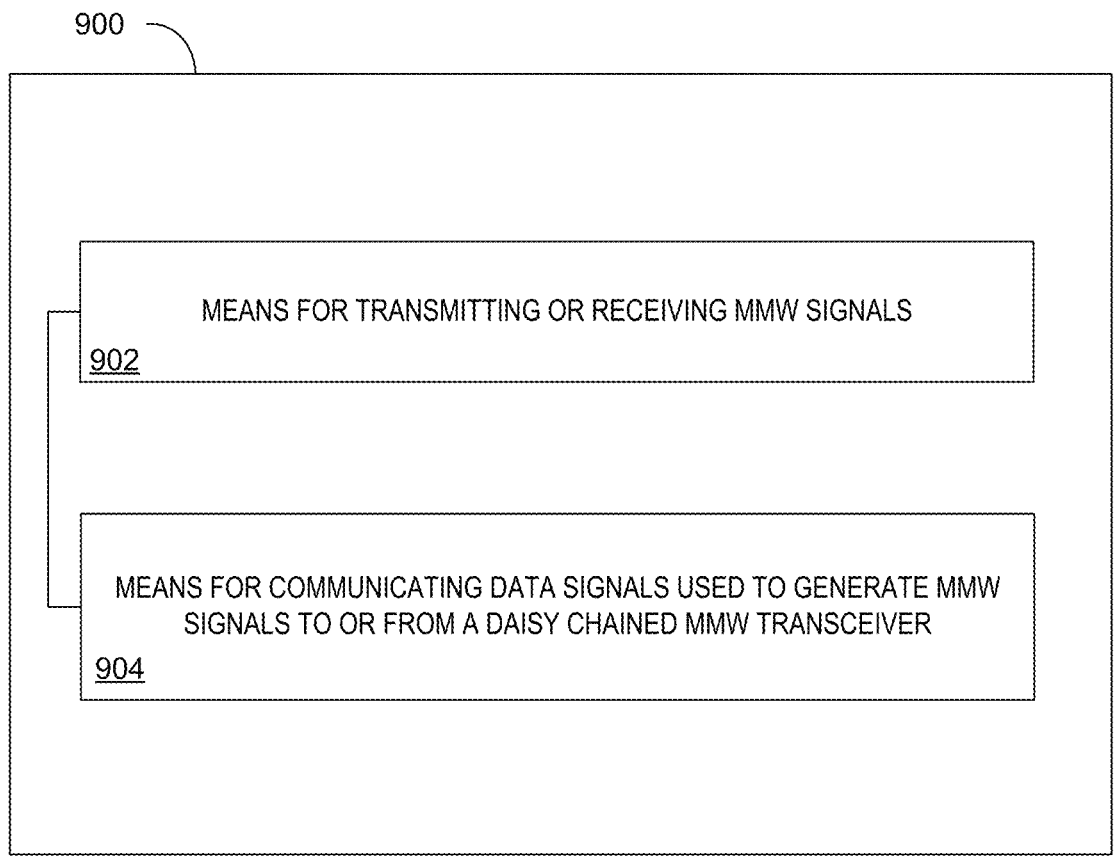
FIG. 9 is a functional block diagram of an apparatus including a chained signal routing for a large phase array in accordance with some aspects.

FIG. 9 is a functional block diagram of an apparatus including a chained signal routing for a large phase array in accordance with some aspects. The apparatus 900 comprises means 902 for transmitting and/or receiving mmW signals. The apparatus 900 further comprises means 904 for communicating data signals used to generate mmW signals to or from a daisy chained mmW transceiver. The daisy chained mmW transceiver can be connected directly to the means 904 (e.g., via routing to communication ports of the means 904 and the daisy chained mmW transceiver), or can be connected via additional instances of means 904 or similar devices including both means for transmitting or receiving mmW signals and means for routing data signals used to generate mmW signals along a daisy chain signal path.

The apparatus 900 can additionally include means for selecting between the means 902 and the means 904 (e.g., using circuitry of FIG. 4 or FIG. 5). In some aspects, the apparatus 900 can further include means for duplexing signals, and means for converting IF data signals or portions of IF data signals between IF frequencies and mmW frequencies (e.g., to convert between IF frequency data signals and mmW signals transmitted or received via antennas of the apparatus 900). In various aspects, apparatus 900 can additionally include elements in accordance with any description provided herein. In some aspects, apparatus 900 can further include means for serial connection of merged chain clock and data signals as well as merged chain control and data signals to a mmW transceiver in a daisy chain as described herein.

Various devices described herein are illustrated with an IF frequency used to provide a signal to mmW transceivers. In various examples, any structure can be used for converting digital signals into mmW signals. In some aspects, IF frequencies are provided to separate mmW transceivers using the described daisy chain structures, with IF to mmW conversion occurring within mmW transceivers. In other aspects, mmW signals are generated at a transceiver, and mmW signals are communicated up and down the daisy chain, with down conversion from mmW frequencies occurring outside of the daisy chain structure. Thus, in some aspects, the data paths described in aspects above can be configured as routing paths structured to propagate mmW frequency signals. In some such aspects, a baseband signal is converted to a mmW frequency using direct conversion in a transceiver connected to a processor. Similarly, received mmW signals may be converted to baseband via direct conversion or using a low or zero IF configuration in the transceiver connected to the processor. In other aspects, a super-heterodyne architecture is used (e.g., and is contained entirely within a single transceiver connected to the processor), but mmW signals are propagated between the mmW transceivers.

Devices, networks, systems, and certain means for transmitting or receiving signals described herein may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles, and will be referred to herein as "sub-7 GHz". A similar nomenclature issue sometimes occurs with regard to FR2, which is often referred to (interchangeably) as a "millimeter wave" (mmW) band in documents and articles, despite including frequencies outside of the extremely high frequency (EHF) band (30 GHz-300 GHz) which is identified by the International Telecommunications Union (ITU) as a "mmWave" or mmW band.

With the above aspects in mind, unless specifically stated otherwise, it should be understood that the term "sub-7 GHz" or the like if used herein may broadly represent frequencies that may be less than 7 GHz, may be within FR1, or may include mid-band frequencies. Further, unless specifically stated otherwise, it should be understood that the term "mmWave", mmW, or the like if used herein may broadly represent frequencies that may include mid-band frequencies, may be within FR2, or may be within the EHF band.

The circuit architecture described herein described herein may be implemented on one or more ICs, analog ICs, mmWICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR) or corresponding mmW elements, (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

Illustrative aspects of the present disclosure include, but are not limited to:

Aspect 1. A wireless communication apparatus, comprising: a first millimeter wave (mmW) transceiver, the first mmW transceiver comprising: a first port for communicating a merged control and data signal; a second port for communicating a merged clock and data signal associated with the merged control and data signal; one or more antenna elements; a plurality of chain mmW transceiver ports; and switching circuitry controllable by control data to route portions of the merged clock and data signal and the merged control and data signal between: a first route between the one or more antenna elements and the first port and a second route between the one or more antenna elements and the second port; and a third route between the first port and the plurality of chain mmW transceiver ports and a fourth route between the second port and the plurality of chain mmW transceiver ports.

Aspect 2. The wireless communication apparatus of aspect 1, further comprising: a second mmW transceiver, the second mmW transceiver comprising: a first port coupled to a first data port of the plurality of chain mmW transceiver ports; and a second port coupled to a second data port of the plurality of chain mmW transceiver ports.

Aspect 3. The wireless communication apparatus of aspect 2, wherein the first data port is a chained control and data port coupled to a first multiplexing diplexer of the first mmW transceiver; wherein the second data port is a chained clock and data port coupled to a second multiplexing diplexer of the first mmW transceiver.

Aspect 4. The wireless communication apparatus of aspect 2, wherein the second mmW transceiver further comprises a second clock port coupled to a first clock port of the plurality of chain mmW transceiver ports as part of a chain clock path.

Aspect 5. The wireless communication apparatus of aspect 4, wherein the second mmW transceiver further comprises a second control port coupled to a first control port of the plurality of chain mmW transceiver ports as part of a chain control path.

Aspect 6. The wireless communication apparatus of any of aspects 2 through 5, wherein the first mmW transceiver comprises a first demultiplexing diplexer that couples the first port of the first mmW transceiver to the first data port and the first clock port to demultiplex the merged clock and data signal into separate clock and data signals.

Aspect 7. The wireless communication apparatus of aspect 6, wherein the first mmW transceiver comprises a second demultiplexing diplexer that couples the second port of the first mmW transceiver to the second data port and the first control port to demultiplex the merged control and data signal into separate control and data signals.

Aspect 8. The wireless communication apparatus of any of aspects 2 through 7, wherein the first mmW transceiver further comprises: first frequency conversion circuitry in the first route configured to convert a first data signal associated with the merged control and data signal between IF frequencies and mmW frequencies; and second frequency conversion circuitry in the second route configured to convert a second data signal associated with the merged clock and data signal between the IF frequencies and the mmW frequencies.

Aspect 9. The wireless communication apparatus of any of aspects 2 through 7, wherein the first mmW transceiver further comprises frequency conversion circuitry in the first route configured to convert a data signal associated with the merged control and data signal between baseband frequencies and mmW frequencies.

Aspect 10. The wireless communication apparatus of any of aspects 2 through 9, wherein the second mmW transceiver further comprises: second one or more antenna elements; and second switching circuitry controllable by the control data to select between: a fifth route coupling the first port to the one or more antenna elements and a sixth route coupling the second port to the one or more antenna elements; and a seventh route coupling the first port to a first chained data port of the second mmW transceiver and an eighth route coupling the second port to a second chained data port of the second mmW transceiver.

Aspect 11. The wireless communication apparatus of aspect 10, wherein the second mmW transceiver further comprises: first frequency conversion circuitry in the fifth route configured to convert a first data signal associated with the merged control and data signal between IF frequencies and mmW frequencies; and second frequency conversion circuitry in the sixth route configured to convert a second data signal associated with the merged clock and data signal between the IF frequencies and the mmW frequencies.

Aspect 12. The wireless communication apparatus of aspect 11, further comprising a third mmW transceiver, the third mmW transceiver comprising: third one or more antenna elements; a first port coupled to the first chained data port, the first port configured to communicate a first data signal associated with the merged control and data signal with the second mmW transceiver; a second port coupled to the second chained data port, the second port configured to communicate a second data signal associated with the merged clock and data signal with the second mmW transceiver; a third port coupled to a chained control port of the second mmW transceiver, the second port configured to communicate a control signal associated with the merged control and data signal; and a fourth port coupled to a chained clock port of the second mmW transceiver, the fourth port configured to communicate a clock signal associated with the merged clock and data signal.

Aspect 13. The wireless communication apparatus of aspect 12 further comprising: a processor; and an intermediate frequency (IF) transceiver coupled to the processor, the IF transceiver comprising: an IF merged clock and data port coupled to the first port of the first mmW transceiver as part of a merged clock and data path for the merged clock and data signal; and an IF merged control and data port coupled to the second port of the first mmW transceiver as part of a merged control and data path for the merged control and data signal.

Aspect 14. The wireless communication apparatus of aspect 13, wherein the wireless communication apparatus is configured to transmit the first data signal and the second data signal via the third one or more antenna elements using the first data signal, the second data signal, the clock signal, and the control signal received from the IF transceiver via the first mmW transceiver and the second mmW transceiver.

Aspect 15. The wireless communication apparatus of aspect 13, wherein the wireless communication apparatus is configured to: receive the first data signal, the second data signal, the clock signal, and the control signal at the third one or more antennas; communicate the first data signal and the control signal to the IF merged control and data port of the IF transceiver via the second mmW transceiver and the first mmW transceiver; communicate the second data signal and the clock signal to the IF merged clock and data port of the IF transceiver via the second mmW transceiver and the first mmW transceiver; and process the data signal using the processor.

Aspect 16. The wireless communication apparatus of aspect 15, wherein the first mmW transceiver is configured to merge the first data signal and the control signal into the merged control and data signal using a first diplexer; wherein the first mmW transceiver is configured to merge the second data signal and the control signal into the merged clock and data signal using a second diplexer.

Aspect 17. The wireless communication apparatus of any of aspects 1 through 16, further comprising: a display screen; and control circuitry coupled to the display screen and the first mmW transceiver and configured to transmit and receive data using a daisy chain routing including the first mmW transceiver.

Aspect 18. The wireless communication apparatus of any of aspects 1 through 17, wherein the first route comprises a first transmit path variable gain amplifier (VGA), a first receive path VGA coupled between the first port and the one or more antenna elements, and switching circuitry to select between the first transmit path VGA and the first receive path VGA; wherein the second route comprises a second transmit path VGA, a second receive path VGA coupled between the second port and the one or more antenna elements, and switching circuitry to select between the second transmit path VGA and the second receive path VGA.

Aspect 19. The wireless communication apparatus of any of aspects 1 through 18, wherein the third route comprises a first receive signal path VGA buffer, a first transmit signal path VGA buffer, and switching circuitry to select between the first receive signal path VGA buffer and the first transmit signal path VGA buffer; wherein the fourth route comprises a second receive signal path VGA buffer, a second transmit signal path VGA buffer, and switching circuitry configured to select between the second receive signal path VGA buffer and the second transmit signal path VGA buffer.

Aspect 20. The wireless communication apparatus of any of aspects 1 through 7 or 17 through 19, wherein the wireless communication apparatus is configured to convert baseband signals to mmW signals without the use of an intermediate frequency (IF) signal.

Aspect 21: The wireless communication apparatus of claim 1, wherein the first route, the second route, the third route, and the fourth route are configured for mmW signals.

Aspect 22. The wireless communication apparatus of claim 1, further comprising: a first diplexer having a merged control signal terminal coupled to the first port, a control terminal, and a first data terminal; a second diplexer having a merged clock signal terminal coupled to the second port, a clock terminal, and a second data terminal; a third diplexer having a chain clock signal terminal coupled to a first port of the plurality of chain mmW transceiver ports, a third data terminal coupled to the first data terminal, and a second control terminal coupled to the control terminal; and a fourth diplexer having a chain control signal terminal coupled to a second port of the plurality of chain mmW transceiver ports, a fourth data terminal coupled to the second data terminal, and a second clock terminal coupled to the clock terminal; wherein the first route includes a signal path between the one or more antenna elements and the first data terminal, the second route includes a signal path between the one or more antenna elements and the second data terminal, the third route includes a signal path between the first data terminal and the third data terminal, and the fourth route includes a signal path between the second data terminal and the fourth data terminal.

Aspect 23. The wireless communication apparatus of claim 1, further comprising: a first diplexer having a merged control signal terminal coupled to the first port, a control terminal, and a first data terminal; a first chain signal port coupled to the first data terminal; a chain control port coupled to the control terminal; a second diplexer having a merged clock signal terminal coupled to the second port, a clock terminal, and a second data terminal; a second chain signal port coupled to the second data terminal; and a clock port coupled to the clock terminal.

Aspect 24. A method comprising: generating a first analog data signal and a second analog data signal; generating control data and clock data for the first analog data signal and the second analog data signal; merging, by an intermediate frequency (IF) transceiver, the control data and the first analog data signal to generate a merged control and data signal; merging, by the IF transceiver, the clock data and the second analog data signal to generate a merged clock and data signal; and communicating the first analog data signal and the second analog data signal between the IF transceiver and a target mmW transceiver via a daisy chain routing, wherein the daisy chain routing comprises at least a first mmW transceiver in the daisy chain routing between the IF transceiver and the target mmW transceiver.

Aspect 25. The method of aspect 24, further comprising: splitting the merged control and data signal using a first diplexer of a first mmW transceiver between the IF transceiver and the target mmW transceiver; splitting the merged clock and data signal using a second diplexer of a first mmW transceiver between the IF transceiver and the target mmW transceiver; and routing, by the first mmW transceiver, the clock signal, the control signal, the first analog data signal, and the second analog data signal to the target mmW transceiver.

Aspect 26. The method of any of aspects 24 through 25, further comprising: receiving a third analog data signal, a fourth analog data signal, a second control signal, and a second clock signal at one or more antennas of the target mmW transceiver; and downconverting the third analog data signal and the fourth analog data signal from mmW frequencies to IF frequencies using frequency conversion circuitry of the target mmW transceiver.

Aspect 27. The method of aspect 26, further comprising: communicating the third analog data signal, a fourth analog data signal, the second control signal, and the second clock signal to the first mmW transceiver from the target mmW transceiver; merging, by a first diplexer of the first mmW transceiver, the second control signal and the third analog data signal to generate a second merged control and data signal; and merging, by a second diplexer of the first mmW transceiver, the clock data and the second analog data signal to generate a second merged clock and data signal.

Aspect 28. The method of aspect 27, further comprising: communicating the second merged control and data signal and the second merged clock and data signal from the first mmW transceiver to the IF transceiver; generating, by the IF transceiver, the second analog data signal using the second merged control and data signal and the second merged clock and data signal; converting the second analog data signal to a second digital data signal using an analog to digital converter coupled to the IF transceiver; and processing the second digital data signal using a processor coupled to the analog to digital converter.

Aspect 29. A wireless communication apparatus, comprising: a first millimeter wave (mmW) transceiver; and a second mmW transceiver coupled to the first mmW transceiver via a daisy chain routing path; the first mmW transceiver comprising: a plurality of intermediate frequency (IF) transceiver connection ports; one or more antenna elements; and switching circuitry configured to select between connecting the plurality of IF transceiver connection ports to the one or more antenna elements and connecting the plurality of IF transceiver connection ports to the second mmW transceiver via the daisy chain routing path.

Aspect 30. The wireless communication apparatus of aspect 29, wherein the first mmW transceiver further comprises: a first diplexer coupled to a first port of the plurality of IF transceiver connection ports, a first data port of the second mmW transceiver, and a control port of the second mmW transceiver; wherein the first diplexer is configured for two-way operation to convert between a merged control and data signal communicated with an IF transceiver via the first port and separate control and first data signals communicated with the second mmW transceiver via the control port and the first data port; wherein the daisy chain routing path comprises the control port and the first data port.

Aspect 31. The wireless communication apparatus any of aspects 29 through 30, wherein the first mmW transceiver further comprises: a second diplexer coupled to a second port of the plurality of IF transceiver connection ports, a second data port of the second mmW transceiver, and a clock port of the second mmW transceiver; wherein the second diplexer is configured for two-way operation to convert between a merged clock and data signal communicated with the IF transceiver via the second port and separate clock and second data signals communicated with the second mmW transceiver via the control port and the second data port; wherein the daisy chain routing path comprises the clock port and the second data port.

Aspect 32: A wireless communication apparatus comprising means for transmitting or receiving mmW signals;

and means for communicating an IF signal used to generated mmW signals to or from a mmW transceiver via a daisy chain routing.

Aspect 33: A wireless communication apparatus comprising means for selecting between the means for transmitting or receiving mmW signals the means for communicating the IF signal used to generated the mmW signals to or from the mmW transceiver via the daisy chain routing.

Aspect 34: An apparatus comprising means for performing operations according to any of aspects 1 through 31 above.

Aspect 35: A non-transitory computer-readable storage medium comprising instructions stored thereon which, when executed by one or more processors, cause the one or more processors to implement operations according to any of aspects 1 through 31 above.

What is claimed is:

1. A wireless communication apparatus, comprising:
   a first millimeter wave (mmW) transceiver, the first mmW transceiver comprising:
   a first port for communicating a merged control and data signal;
   a second port for communicating a merged clock and data signal associated with the merged control and data signal;
   one or more antenna elements;
   a plurality of chain mmW transceiver ports; and
   switching circuitry controllable by control data to route portions of the merged clock and data signal and the merged control and data signal between:
      a first route between the one or more antenna elements and the first port and a second route between the one or more antenna elements and the second port; and
      a third route between the first port and the plurality of chain mmW transceiver ports and a fourth route between the second port and the plurality of chain mmW transceiver ports.

2. The wireless communication apparatus of claim 1, further comprising:
   a second mmW transceiver, the second mmW transceiver comprising:
   a first port coupled to a first data port of the plurality of chain mmW transceiver ports; and
   a second port coupled to a second data port of the plurality of chain mmW transceiver ports.

3. The wireless communication apparatus of claim 2, wherein the first data port is a chained control and data port coupled to a first multiplexing diplexer of the first mmW transceiver;
   wherein the second data port is a chained clock and data port coupled to a second multiplexing diplexer of the first mmW transceiver.

4. The wireless communication apparatus of claim 2, wherein the second mmW transceiver further comprises a second clock port coupled to a first clock port of the plurality of chain mmW transceiver ports as part of a chain clock path.

5. The wireless communication apparatus of claim 4, wherein the second mmW transceiver further comprises a second control port coupled to a first control port of the plurality of chain mmW transceiver ports as part of a chain control path.

6. The wireless communication apparatus of claim 5, wherein the first mmW transceiver comprises a first diplexer that couples the first port of the first mmW transceiver to the first data port and the first clock port to demultiplex the merged clock and data signal into separate clock and data signals.

7. The wireless communication apparatus of claim 6, wherein the first mmW transceiver comprises a second diplexer that couples the second port of the first mmW transceiver to the second data port and the first control port to demultiplex the merged control and data signal into separate control and data signals.

8. The wireless communication apparatus of claim 2, wherein the first mmW transceiver further comprises:
   first frequency conversion circuitry in the first route configured to convert a first data signal associated with the merged control and data signal between IF frequencies and mmW frequencies; and
   second frequency conversion circuitry in the second route configured to convert a second data signal associated with the merged clock and data signal between the IF frequencies and the mmW frequencies.

9. The wireless communication apparatus of claim 2, wherein the first mmW transceiver further comprises frequency conversion circuitry in the first route configured to convert a data signal associated with the merged control and data signal between baseband frequencies and mmW frequencies.

10. The wireless communication apparatus of claim 2, wherein the second mmW transceiver further comprises:
    second one or more antenna elements; and
    second switching circuitry controllable by the control data to select between:
       a fifth route coupling the first port to the one or more antenna elements and a sixth route coupling the second port to the one or more antenna elements; and
       a seventh route coupling the first port to a first chained data port of the second mmW transceiver and an eighth route coupling the second port to a second chained data port of the second mmW transceiver.

11. The wireless communication apparatus of claim 10, wherein the second mmW transceiver further comprises:
    first frequency conversion circuitry in the fifth route configured to convert a first data signal associated with the merged control and data signal between IF frequencies and mmW frequencies; and
    second frequency conversion circuitry in the sixth route configured to convert a second data signal associated with the merged clock and data signal between the IF frequencies and the mmW frequencies.

12. The wireless communication apparatus of claim 11, further comprising a third mmW transceiver, the third mmW transceiver comprising:
    third one or more antenna elements;
    a first port coupled to the first chained data port, the first port configured to communicate the first data signal associated with the merged control and data signal with the second mmW transceiver;
    a second port coupled to the second chained data port, the second port configured to communicate the second data signal associated with the merged clock and data signal with the second mmW transceiver;
    a third port coupled to a chained control port of the second mmW transceiver, the second port configured to communicate a control signal associated with the merged control and data signal; and
    a fourth port coupled to a chained clock port of the second mmW transceiver, the fourth port configured to communicate a clock signal associated with the merged clock and data signal.

13. The wireless communication apparatus of claim 12 further comprising:
a processor; and
an intermediate frequency (IF) transceiver coupled to the processor, the IF transceiver comprising:
an IF merged clock and data port coupled to the first port of the first mmW transceiver as part of a merged clock and data path for the merged clock and data signal; and
an IF merged control and data port coupled to the second port of the first mmW transceiver as part of a merged control and data path for the merged control and data signal.

14. The wireless communication apparatus of claim 13, wherein the wireless communication apparatus is configured to transmit the first data signal and the second data signal via the third one or more antenna elements using the first data signal, the second data signal, the clock signal, and the control signal received from the IF transceiver via the first mmW transceiver and the second mmW transceiver.

15. The wireless communication apparatus of claim 13, wherein the wireless communication apparatus is configured to:
receive the first data signal, the second data signal, the clock signal, and the control signal at the third one or more antenna elements;
communicate the first data signal and the control signal to the IF merged control and data port of the IF transceiver via the second mmW transceiver and the first mmW transceiver;
communicate the second data signal and the clock signal to the IF merged clock and data port of the IF transceiver via the second mmW transceiver and the first mmW transceiver; and
process the first and second data signals using the processor.

16. The wireless communication apparatus of claim 15, wherein the first mmW transceiver is configured to merge the first data signal and the control signal into the merged control and data signal using a first diplexer;
wherein the first mmW transceiver is configured to merge the second data signal and the control signal into the merged clock and data signal using a second diplexer.

17. The wireless communication apparatus of claim 1, further comprising:
a display screen; and
control circuitry coupled to the display screen and the first mmW transceiver and configured to transmit and receive data using a daisy chain routing including the first mmW transceiver.

18. The wireless communication apparatus of claim 1, wherein the first route comprises a first transmit path variable gain amplifier (VGA), a first receive path VGA coupled between the first port and the one or more antenna elements, and switching circuitry to select between the first transmit path VGA and the first receive path VGA;
wherein the second route comprises a second transmit path VGA, a second receive path VGA coupled between the second port and the one or more antenna elements, and switching circuitry to select between the second transmit path VGA and the second receive path VGA.

19. The wireless communication apparatus of claim 18, wherein the third route comprises a first receive signal path VGA buffer, a first transmit signal path VGA buffer, and switching circuitry to select between the first receive signal path VGA buffer and the first transmit signal path VGA buffer;

wherein the fourth route comprises a second receive signal path VGA buffer, a second transmit signal path VGA buffer, and switching circuitry configured to select between the second receive signal path VGA buffer and the second transmit signal path VGA buffer.

20. The wireless communication apparatus of claim 1, wherein the wireless communication apparatus is configured to convert baseband signals to mmW signals without use of an intermediate frequency (IF) signal.

21. The wireless communication apparatus of claim 1, wherein the first route, the second route, the third route, and the fourth route are configured for mmW signals.

22. The wireless communication apparatus of claim 1, further comprising:
a first diplexer having a merged control signal terminal coupled to the first port, a control terminal, and a first data terminal;
a second diplexer having a merged clock signal terminal coupled to the second port, a clock terminal, and a second data terminal;
a third diplexer having a chain clock signal terminal coupled to a first port of the plurality of chain mmW transceiver ports, a third data terminal coupled to the first data terminal, and a second control terminal coupled to the control terminal; and
a fourth diplexer having a chain control signal terminal coupled to a second port of the plurality of chain mmW transceiver ports, a fourth data terminal coupled to the second data terminal, and a second clock terminal coupled to the clock terminal;
wherein the first route includes a first signal path between the one or more antenna elements and the first data terminal, the second route includes a second signal path between the one or more antenna elements and the second data terminal, the third route includes a third signal path between the first data terminal and the third data terminal, and the fourth route includes a signal path between the second data terminal and the fourth data terminal.

23. The wireless communication apparatus of claim 1, further comprising:
a first diplexer having a merged control signal terminal coupled to the first port, a control terminal, and a first data terminal;
a first chain signal port coupled to the first data terminal;
a chain control port coupled to the control terminal;
a second diplexer having a merged clock signal terminal coupled to the second port, a clock terminal, and a second data terminal;
a second chain signal port coupled to the second data terminal; and
a clock port coupled to the clock terminal.

24. A method comprising:
generating a first data signal and a second data signal;
generating a control data and clock data for the first data signal and the second data signal;
merging, by an intermediate frequency (IF) transceiver, the control data and the first data signal to generate a merged control and data signal;
merging, by the IF transceiver, the clock data and the second data signal to generate a merged clock and data signal; and
communicating the first data signal and the second data signal between the IF transceiver and a target mmW transceiver via a daisy chain routing, wherein the daisy chain routing comprises at least a first mmW transceiver in the daisy chain routing between the IF transceiver and the target mmW transceiver.

25. The method of claim 24, further comprising:
splitting the merged control and data signal using a first diplexer of the first mmW transceiver between the IF transceiver and the target mmW transceiver;
splitting the merged clock and data signal using a second diplexer of the first mmW transceiver between the IF transceiver and the target mmW transceiver; and
routing, by the first mmW transceiver, the clock data, the control data, the first data signal, and the second data signal to the target mmW transceiver.

26. The method of claim 24, further comprising:
receiving a third analog data signal, a fourth analog data signal, a second control signal, and a second clock signal at one or more antennas of the target mmW transceiver; and
downconverting the third analog data signal and the fourth analog data signal from mmW frequencies to IF frequencies using frequency conversion circuitry of the target mmW transceiver.

27. The method of claim 26, further comprising:
communicating the third analog data signal, the fourth analog data signal, the second control signal, and the second clock signal to the first mmW transceiver from the target mmW transceiver;
merging, by a first diplexer of the first mmW transceiver, the second control signal and the third analog data signal to generate a second merged control and data signal;
merging, by a second diplexer of the first mmW transceiver, the clock data and the fourth analog data signal to generate a second merged clock and data signal;
communicating the second merged control and data signal and the second merged clock and data signal from the first mmW transceiver to the IF transceiver;
converting the third and fourth analog data signals to third and fourth digital data signals using an analog to digital converter in the IF transceiver; and
processing the third and fourth digital data signals using a processor coupled to the analog to digital converters.

28. A wireless communication apparatus, comprising:
a first millimeter wave (mmW) transceiver; and
a second mmW transceiver coupled to the first mmW transceiver via a daisy chain routing path;
the first mmW transceiver comprising:
a plurality of intermediate frequency (IF) transceiver connection ports;
one or more antenna elements; and
switching circuitry configured to select between connecting the plurality of IF transceiver connection ports to the one or more antenna elements and connecting the plurality of IF transceiver connection ports to the second mmW transceiver via the daisy chain routing path.

29. The wireless communication apparatus of claim 28, wherein the first mmW transceiver further comprises:
a first diplexer coupled to a first port of the plurality of IF transceiver connection ports, a first data port of the second mmW transceiver, and a control port of the second mmW transceiver;
wherein the first diplexer is configured for two-way operation to convert between a merged control and data signal communicated with an IF transceiver via the first port and separate control and first data signals communicated with the second mmW transceiver via the control port and the first data port;
wherein the daisy chain routing path comprises the control port and the first data port.

30. The wireless communication apparatus of claim 29, wherein the first mmW transceiver further comprises:
a second diplexer coupled to a second port of the plurality of IF transceiver connection ports, a second data port of the second mmW transceiver, and a clock port of the second mmW transceiver;
wherein the second diplexer is configured for two-way operation to convert between a merged clock and data signal communicated with the IF transceiver via the second port and separate clock and second data signals communicated with the second mmW transceiver via the control port and the second data port;
wherein the daisy chain routing path comprises the clock port and the second data port.

\* \* \* \* \*